(12) United States Patent
Ikeda

(10) Patent No.: US 6,823,335 B2
(45) Date of Patent: Nov. 23, 2004

(54) INFORMATION SEARCH APPARATUS AND METHOD, AND STORAGE MEDIUM

(75) Inventor: Kazuyo Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/386,686

(22) Filed: Mar. 13, 2003

(65) Prior Publication Data

US 2003/0187836 A1 Oct. 2, 2003

Related U.S. Application Data

(62) Division of application No. 09/412,425, filed on Oct. 5, 1999, now Pat. No. 6,564,206.

(30) Foreign Application Priority Data

| Oct. 5, 1998 | (JP) | 10-296240 |
| Oct. 8, 1998 | (JP) | 10-300319 |
| Oct. 12, 1998 | (JP) | 10-303199 |

(51) Int. Cl.[7] ............................................. G06F 17/18
(52) U.S. Cl. ........................... 707/6; 707/3; 382/217
(58) Field of Search ............................. 707/3, 6, 102, 707/4, 5, 2; 715/526; 382/217, 218, 305

(56) References Cited

U.S. PATENT DOCUMENTS

| 5,893,095 A | 4/1999 | Jain et al. ........................ 707/6 |
| 6,181,818 B1 | 1/2001 | Sato et al. ................... 382/170 |
| 6,240,423 B1 | 5/2001 | Hirata ........................ 707/104 |
| 6,269,358 B1 | 7/2001 | Hirata ............................. 707/1 |
| 6,285,995 B1 | 9/2001 | Abdel-Mottaleb et al. ..... 707/3 |
| 6,345,274 B1 | 2/2002 | Zhu et al. ....................... 707/5 |
| 6,377,945 B1 * | 4/2002 | Risvik ........................... 707/3 |
| 6,567,551 B2 * | 5/2003 | Shiiyama .................... 382/217 |

FOREIGN PATENT DOCUMENTS

| JP | 8-339375 | 12/1996 | ........... G06F/17/30 |

* cited by examiner

Primary Examiner—Sanjiv Shah
(74) Attorney, Agent, or Firm—Fitzpatrick, Cella, Harper & Scinto

(57) ABSTRACT

An information search apparatus includes query condition input means for inputting a query condition, storage means for storing a plurality of image data which undergo a search, first similarity calculation means for calculating similarity values between the query condition and the individual image data by comparing the query condition with each image data stored in the storage means, first search result display means for displaying the search results on the basis of the similarity values calculated by the first similarity calculation means, image selection means for selecting a specific image from the image data displayed as the search results by the first search result display means, second similarity calculation means for calculating the similarity values between the specific image selected by the image selection means and the plurality of image data stored in the storage means, and second search result display means for displaying the search results on the basis of the similarity values calculated by the second similarity calculation means.

27 Claims, 30 Drawing Sheets

FIG. 9

| IMAGE ID | IMAGE FILE | COMMENT |
|---|---|---|
| 0 | 0000000.jpg | a red apple |
| ⋮ | ⋮ | ⋮ |
| 100 | 0000100.jpg | a red strawberry on the ..... |
| ⋮ | ⋮ | ⋮ |
| 200 | 0000200.jpg | a green apple in the big ..... |
| ⋮ | ⋮ | ⋮ |
| 300 | 0000300.jpg | a red apple and a yellow ..... |
| ⋮ | ⋮ | ⋮ |

FIG. 10

| 0 | 1 | 2 | 3 | .......... |
|---|---|---|---|---|
| 30 | 60 | 90 | 120 | .......... |

FIG. 11

| NUMBER OF IMAGES | 1 | 2 | | 3 | | | ..... |
|---|---|---|---|---|---|---|---|
| x-COORDINATE | 0 | 0 | 0 | 0 | 45 | -45 | ..... |
| y-COORDINATE | 0 | 35 | -35 | 35 | -35 | -35 | ..... |

FIG. 12

| NUMBER OF IMAGES | 0 | 4 | 10 | ..... |
|---|---|---|---|---|
| RADIUS INCREMENT | 30 | 60 | 90 | ..... |

FIG. 13

| 1 | 2 | 3 | 4 | 5 | 6 | 7 | ..... |
|---|---|---|---|---|---|---|---|
| 90 | 180 | 270 | 0 | 135 | 225 | 315 | ..... |

FIG. 14

| IMAGE ID | SIMILARITY |
|---|---|
| 0 | 1.000 |
| 456 | 1.000 |
| 789 | 1.000 |
| 123 | 0.952 |
| 876 | 0.928 |
| 765 | 0.922 |
| 567 | 0.904 |
| 234 | 0.901 |
| 345 | 0.892 |
| ⋮ | ⋮ |
| 321 | 0.808 |
| 210 | 0.765 |
| ⋮ | ⋮ |

FIG. 15

IMAGE ID

| | |
|---|---|
| 0 | SIMILAR IMAGE LIST |
| 1 | SIMILAR IMAGE LIST |
| 2 | SIMILAR IMAGE LIST |
| 3 | SIMILAR IMAGE LIST |
| ⋮ | |

FIG. 16

|  | 1.0 | 0.9 | 0.8 | 0.7 | 0.6 | 0.5 | ..... |
|---|---|---|---|---|---|---|---|
| (T101) | 3 | 5 | 8 | 6 | 0 | 5 | ..... |

|  | 1.0 | 0.9 | 0.8 | 0.7 | 0.6 | 0.5 | ..... |
|---|---|---|---|---|---|---|---|
| (T102) | 1 | 3 | 4 | 2 | 3 | 0 | ..... |

FIG. 17

| IMAGE ID | REPRESENTATIVE IMAGE ID | SIMILARITY |
|---|---|---|
| ⋮ | ⋮ | ⋮ |
| 567 | 765 | 0.954 |
| 851 | 765 | 0.912 |
| ⋮ | ⋮ | ⋮ |
| 345 | 876 | 0.928 |
| ⋮ | ⋮ | ⋮ |

FIG. 18

| (T201) WINDOW NUMBER | START ZONE | SCALE MARK WIDTH | | | | | | | |
|---|---|---|---|---|---|---|---|---|---|
| | | 1.0 | 0.9 | 0.8 | 0.7 | 0.6 | 0.5 | 0.4 | ... |
| 0 | 0 | 120 | 90 | 90 | -1 | -1 | -1 | -1 | ... |
| 1 | 3 | 30 | 30 | 30 | 90 | 30 | 90 | -1 | ... |
| ⋮ | ⋮ | ⋮ | ⋮ | ⋮ | ⋮ | ⋮ | ⋮ | ⋮ | ⋮ |

FIG. 19

| (T202) WINDOW NUMBER | START ZONE | SCALE MARK WIDTH ||||||||
|---|---|---|---|---|---|---|---|---|---|
| | | 1.0 | 0.9 | 0.8 | 0.7 | 0.6 | 0.5 | 0.4 | ... |
| 0 | 0 | 60 | 60 | 60 | 60 | 60 | -1 | -1 | ... |
| ⋮ | ⋮ | ⋮ | ⋮ | ⋮ | ⋮ | ⋮ | ⋮ | ⋮ | ⋮ |

F I G. 25
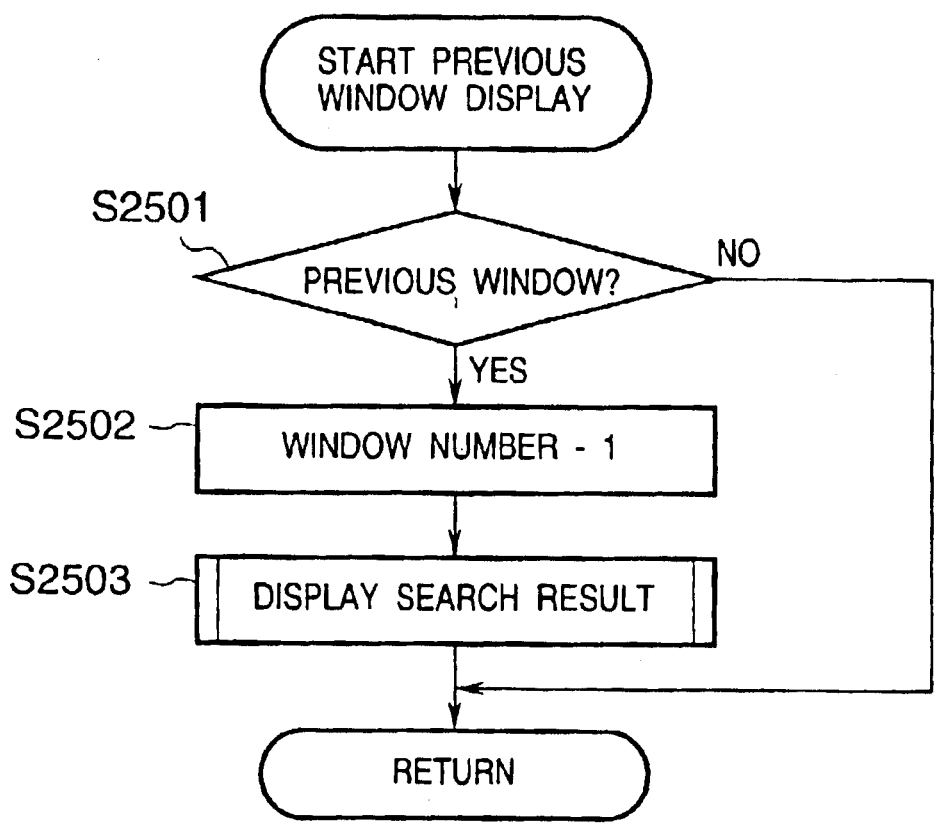

F I G. 30
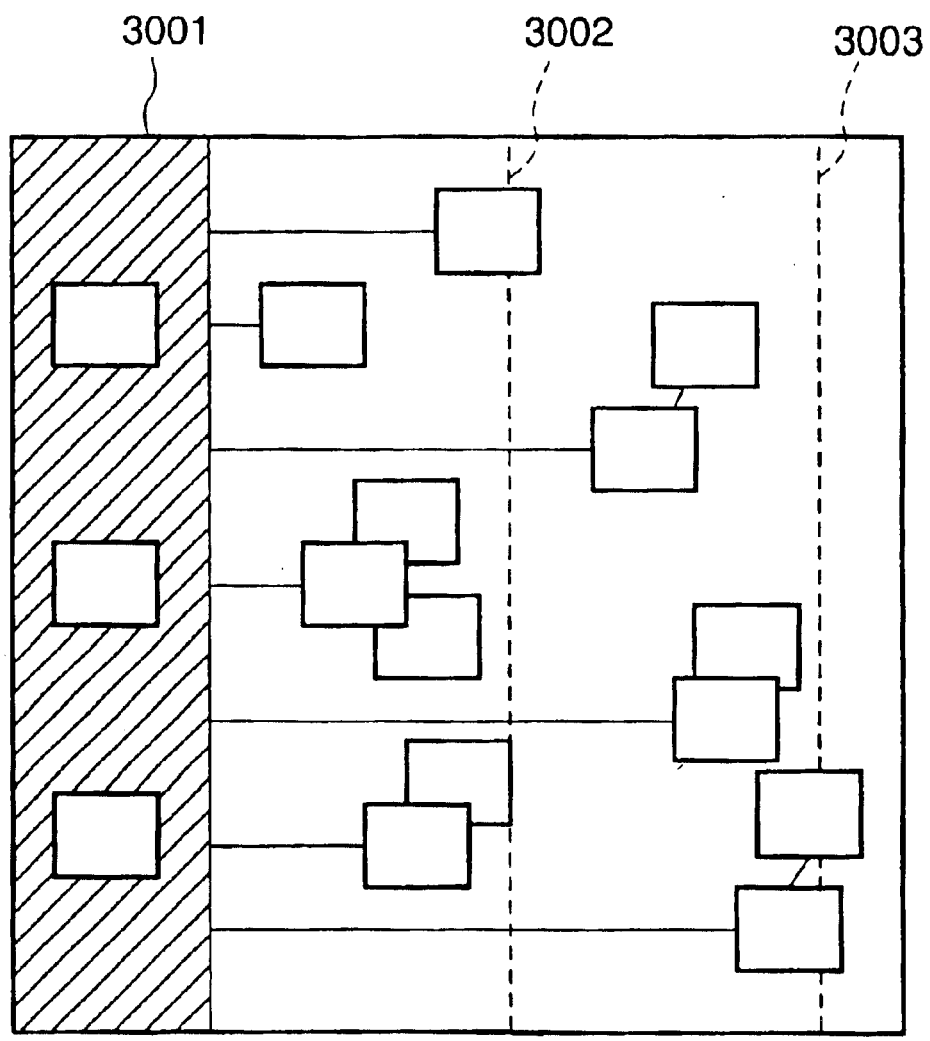

INFORMATION SEARCH APPARATUS AND METHOD, AND STORAGE MEDIUM

This application is a divisional of application Ser. No. 09/412,425, filed on Oct. 5, 1999 now U.S. Pat. No. 6,564,206.

BACKGROUND OF THE INVENTION

The present invention relates to an information search method and apparatus, and a computer readable storage medium which stores a program for searching and displaying information.

Conventionally, as a scheme for searching a storage unit, which stores a collection of images as test information, by inputting a query condition, calculating the matching level or match rate between each information and the query condition, and displaying a plurality of pieces of information as search results on the basis of the calculated matching levels, a scheme for displaying a plurality of pieces of search result information in a two- or three-dimensional space so that search results with higher matching levels are displayed at positions closer to the origin of that space, i.e., the matching levels of the search results can be easily visually recognized, is used, as disclosed in Japanese Patent Laid-Open No. 8-339375.

In the conventional information search apparatus, when a query condition can be accurately expressed, desired search results can be obtained by a search based on such query condition. However, when the information wanted is abstract and a query condition cannot be accurately expressed, it is hard to obtain desired search results by a search based only on the query condition.

In the aforementioned prior art, when there are a large number of pieces of information that satisfy the query condition, a large number of search results are displayed on a region for displaying the search results, and it is difficult to see each retrieved information.

Furthermore, in the above-mentioned conventional method, since the rate of change between the display distance, which is indicated by the number of dots on a display device, and the matching level is fixed, a plurality of pieces of search result information cannot be efficiently displayed on a limited region for displaying search results in correspondence with the distribution of matching levels of those search result information.

SUMMARY OF THE INVENTION

It is, therefore, an object of the present invention to provide an information search apparatus and method, which can solve the conventional problems and can improve operability, or a storage medium.

According to the present invention, there is provided an information search apparatus comprising: query condition input means for inputting a query condition; storage means for storing a plurality of image data which undergo a search; first similarity calculation means for calculating similarity values between the query condition and the individual image data by comparing the query condition with each image data stored in the storage means; first search result display means for displaying search results on the basis of the similarity values calculated by the first similarity calculation means; image selection means for selecting a specific image from the image data displayed as the search results by the first search result display means; second similarity calculation means for calculating similarity values between the specific image selected by the image selection means and the plurality of image data stored in the storage means; and second search result display means for displaying search results on the basis of the similarity values calculated by the second similarity calculation means.

According to the present invention, there is provided an information search method comprising: the query condition input step of storing a plurality of image data which undergo a search, and inputting a query condition; the first similarity calculation step of calculating similarity values between the query condition and the individual image data by comparing the query condition with each stored image data; the first search result display step of displaying search results on the basis of the similarity values calculated in the first similarity calculation step;

the image selection step of selecting a specific image from the image data displayed as the search results in the first search result display step; the second similarity calculation step of calculating similarity values between the specific image selected in the image selection step and the plurality of stored image data; and the second search result display step of displaying search results on the basis of the similarity values calculated in the second similarity calculation step.

According to the present invention, there is provided a computer readable storage medium which stores a program for searching and displaying information, the program including: a code of a query condition input process for inputting a query condition; a code of a storage process for storing a plurality of image data which undergo a search; a code of a first similarity calculation process for calculating similarity values between the query condition and the individual image data by comparing the query condition with each stored image data; a code of a first search result display process for displaying search results on the basis of the similarity values calculated by the first similarity calculation process;

a code of an image selection process for selecting a specific image from the image data displayed as the search results by the first search result display process; a code of a second similarity calculation process for calculating similarity values between the specific image selected by the image selection process and the plurality of stored image data; and a code of a second search result display process for displaying search results on the basis of the similarity values calculated by the second similarity calculation process.

According to the present invention, there is provided an information search method for searching an information storage unit, which stores a plurality of pieces of information which undergo a search, using an input query condition, and displaying information which satisfies the query condition as a search result, comprising: the matching level calculation step of calculating a matching level as a degree to which the query condition is satisfied by comparing each information stored in the information storage unit with the query condition; the display range determination step of determining and storing a range of the matching level to be displayed as the search result; the search result display step of defining a display position of information which perfectly satisfies the query condition as a perfect match display position, determining a distance from the perfect match display position to a display position of information as the search result in correspondence with the matching level of the information, and displaying information falling within the range determined in the display range determination step; and the display range change step of changing the display range stored in the display range determination step.

According to the present invention, there is provided an information search apparatus for searching an information storage unit, which stores a plurality of pieces of information which undergo a search, using an input query condition, and displaying information which satisfies the query condition as a search result, comprising: matching level calculation means for calculating a matching level as a degree to which the query condition is satisfied by comparing each information stored in the information storage unit with the query condition; display range determination means for determining and storing a range of the matching level to be displayed as the search result; search result display means for defining a display position of information which perfectly satisfies the query condition as a perfect match display position, determining a distance from the perfect match display position to a display position of information as the search result in correspondence with the matching level of the information, and displaying information falling within the range determined by the display range determination means; and display range change means for changing the display range stored by the display range determination means.

According to the present invention, there is provided a computer readable storage medium which stores a program for searching an information storage unit, which stores a plurality of pieces of information which undergo a search, using an input query condition, and displaying information which satisfies the query condition as a search result, the program having a code of the step of controlling to calculate a matching level as a degree to which the query condition is satisfied by comparing each information stored in the information storage unit with the query condition; to determine and store a range of the matching level to be displayed as the search result; to define a display position of information which perfectly satisfies the query condition as a perfect match display position, determine a distance from the perfect match display position to a display position of information as the search result in correspondence with the matching level of the information, and display information falling within the determined range; and to change the stored display range.

According to the present invention, there is provided an information search apparatus for searching and displaying information, comprising: matching level calculation means for calculating a matching level as a degree to which information satisfies a query condition; scale mark display control means for displaying a scale indicating a change in matching level; and search result display control means for displaying information, which satisfies the query condition, on the basis of the matching level.

According to the present invention, there is provided an information search method applied to an information search apparatus for searching and displaying information, comprising: the matching level calculation step of calculating a matching level as a degree to which information satisfies a query condition; the scale mark display control step of displaying a scale mark indicating a change in matching level; and the search result display control step of displaying information, which satisfies the query condition, on the basis of the matching level.

According to the present invention, there is provided a computer readable storage medium which stores a program for searching and displaying information, the program having: a code of the matching level calculation step of calculating a matching level as a degree to which information satisfies a query condition; a code of the scale mark display control step of displaying a scale mark indicating a change in matching level; and a code of the search result display control step of displaying information, which satisfies the query condition, on the basis of the matching level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 shows an example of the structure of an image database on a memory map of the information search apparatus;

FIG. 10 shows an example of the structure of matched zone data on the memory map of the information search apparatus;

FIG. 11 shows an example of the structure of matched image data on the memory map of the information search apparatus;

FIG. 12 shows an example of the structure of radius increment data on the memory map of the information search apparatus;

FIG. 13 shows an example of the structure of layout angle data on the memory map of the information search apparatus;

FIG. 14 shows an example of the structure of a similar image buffer on the memory map of the information search apparatus;

FIG. 15 shows an example of the structure of similar image information on the memory map of the information search apparatus;

FIG. 16 shows an example of the structure of distribution information on the memory map of the information search apparatus;

FIG. 17 shows an example of the structure of group information on the memory map of the information search apparatus;

FIGS. 18 and 19 show an example of the structure of window information on the memory map of the information search apparatus;

FIG. 25 is a flow chart showing the flow of a previous window display process of the information search apparatus;

FIG. 30 shows an example of the configuration of a search result display region of an information search apparatus according to another embodiment of the present invention.

DETAILED DESCRIPTION OF THE PREFERRED EMBODIMENTS

The preferred embodiments of the present invention will be described hereinafter.

Figure 1:
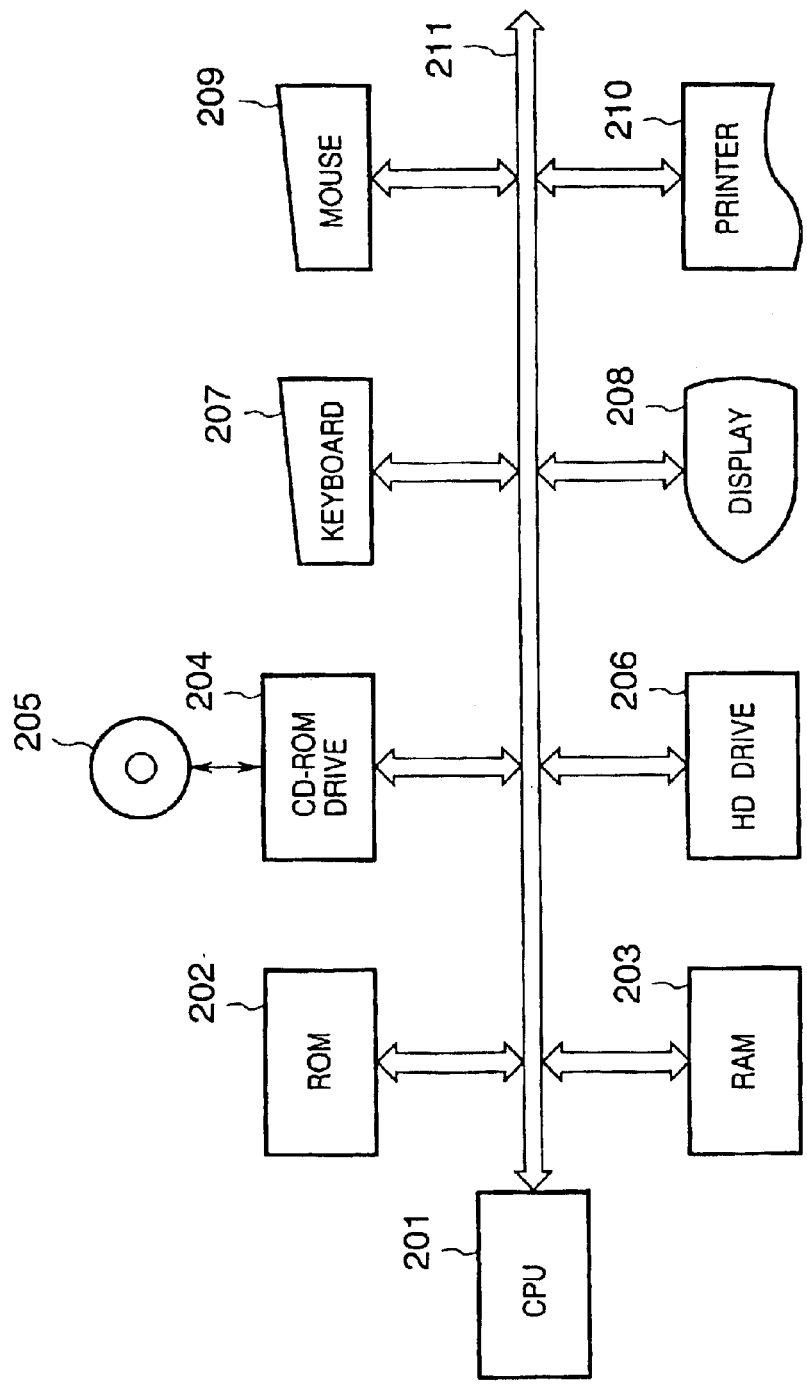
FIG. 1 is a system block diagram of an information search apparatus according to a preferred embodiment of the present invention.

FIG. 1 is a block diagram showing the system arrangement of an information search apparatus according to an embodiment of the present invention. An information search apparatus according to the embodiment of the present invention comprises a CPU 201, ROM 202, RAM 203, CD-ROM drive 204, CD-ROM 205, HD (hard disk) drive 206, keyboard 207, display 208, mouse 207, printer 210, and control bus 211. Note that the arrangement shown in FIG. 1 is merely an example, and the present invention is not limited to such specific illustrated arrangement.

Figure 3:
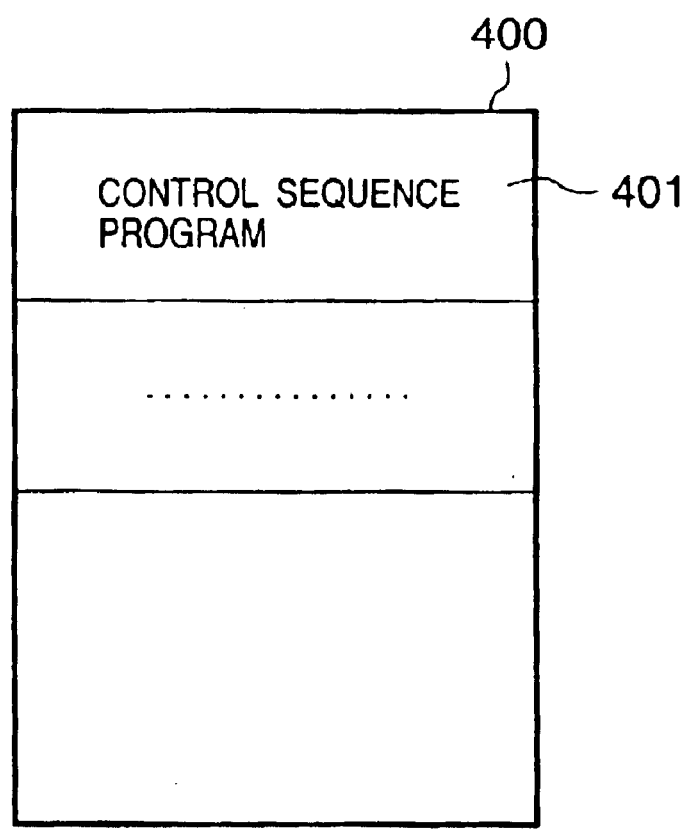
FIG. 3 shows the structure of a ROM of the information search apparatus.
Figure 5:
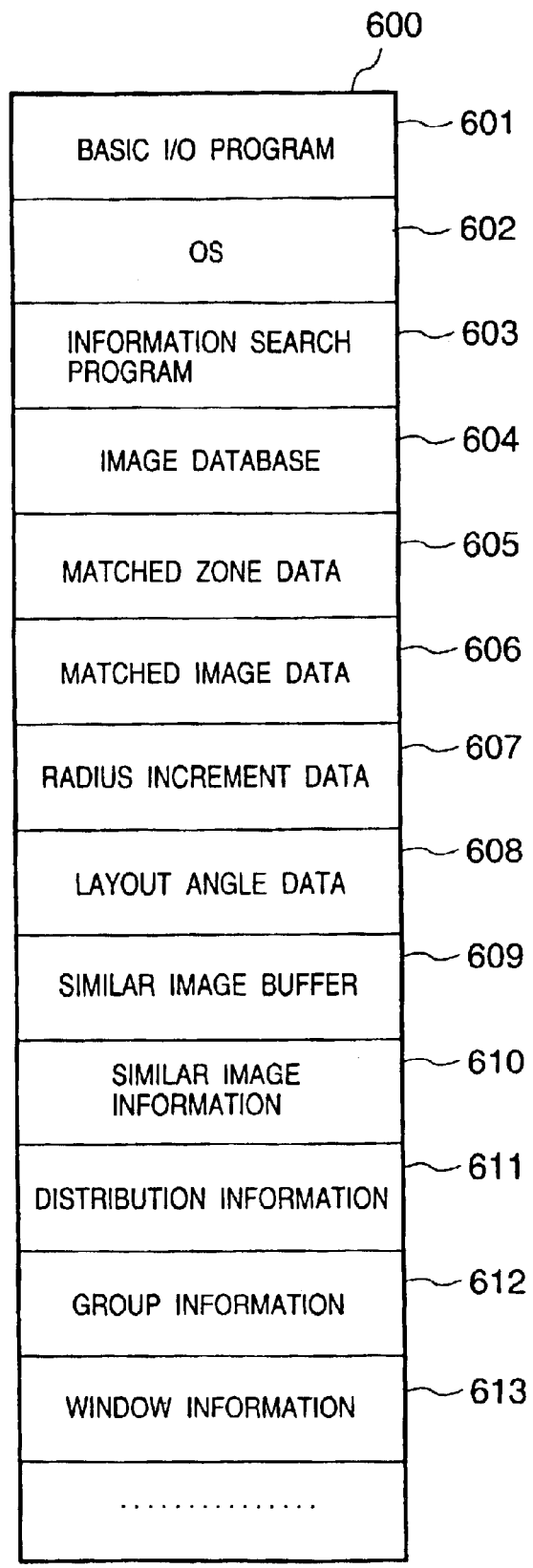
FIG. 5 shows the memory map structure on a RAM upon executing a processing program of the information search apparatus.

The arrangements of the individual units will be explained in detail below. The CPU 201 is a central processing unit, and executes processes shown in the flow charts in FIGS. 20 to 29 (to be described later). The ROM 202 is a read-only memory, and stores a control sequence program 401, as shown in FIG. 3 (to be described later). The RAM 203 is a random access memory, and stores an information search program 603, image database 604, matched zone data 605, matched image data 606, radius increment data 607, layout angle data 608, similar image buffer 609, similar image information 610, distribution information 611, group information 612, window information 613, and the like, as shown in FIG. 5 (to be described later).

The CD-ROM drive 204 controls to read out an information search program and the like from the CD-ROM 205. The CD-ROM 205 stores the information search program and the like. The HD drive 206 controls to read/write data from/to an HD. The keyboard 207 comprises character keys, function keys, and the like, and is used to attain various inputs. The display 208 makes display on the basis of the control of the CPU 201. The mouse 207 is used to input a coordinate position on the display 208. The printer 210 prints on a recording medium. The control bus 211 is a common signal path to which the individual units are connected.

Figure 2:
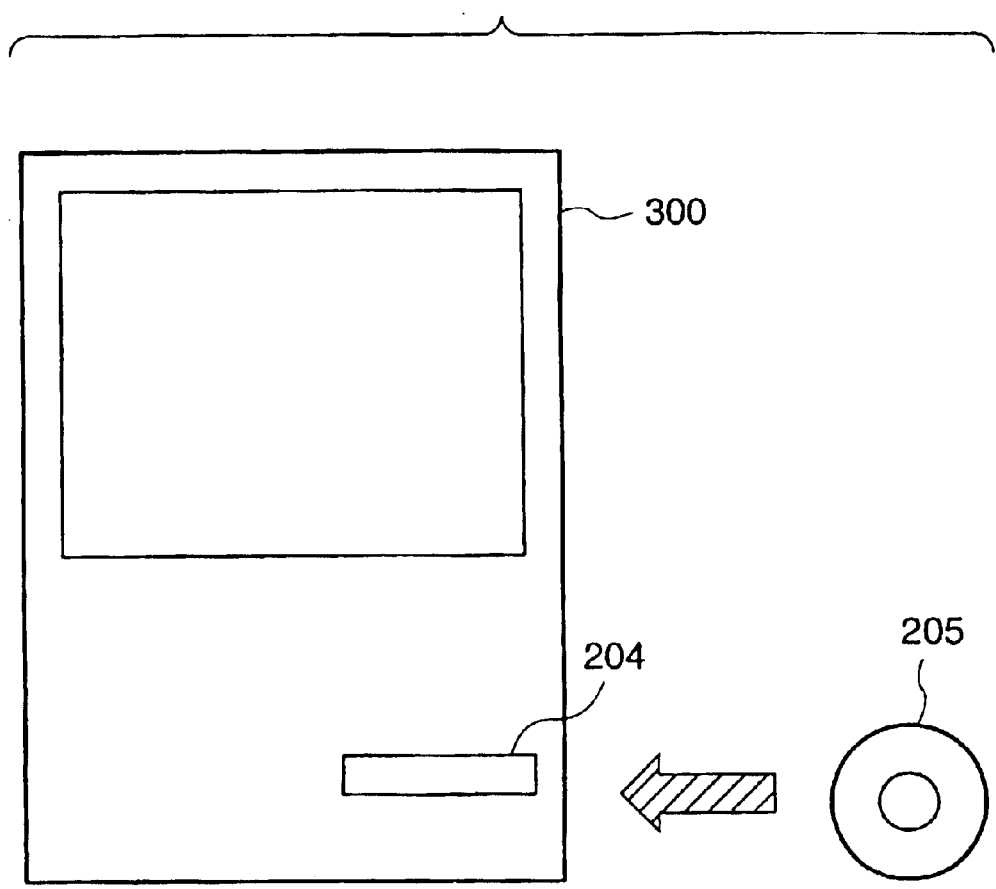
FIG. 2 depicts a state wherein a program or the like of the information search apparatus is supplied from a storage medium to a computer system.

FIG. 2 depicts a state wherein a program or the like is supplied from the CD-ROM 205 to a computer system (information search apparatus). The information search program and the like are supplied by inserting the CD-ROM 205 into the CD-ROM drive 204 of a computer system 300. After that, the information search program and the like are loaded from the CD-ROM 205 onto the RAM 203, and can be executed. Or the information search program and the like read out from the CD-ROM 205 are temporarily stored in the HD of the HD drive 206, and may be loaded from the HD onto the RAM 203 upon executing the information search program.

FIG. 3 shows the structure of the ROM 202. A storage area 400 of the ROM 202 stores a control sequence program 401 and the like.

Figure 4:
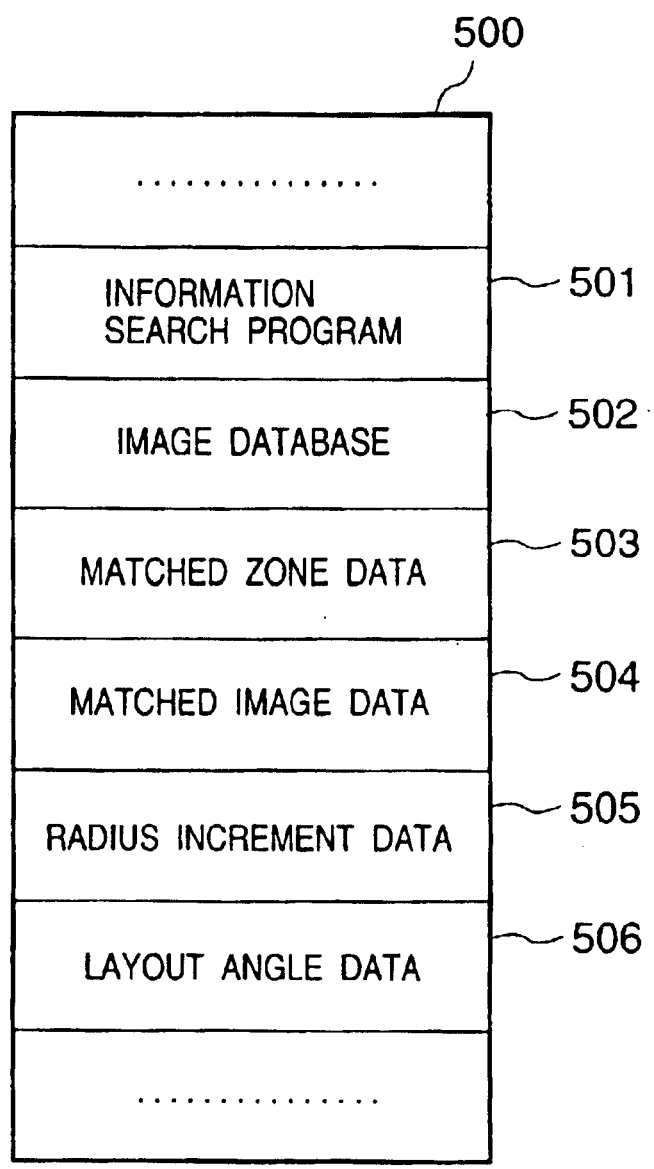
FIG. 4 shows the structure of a storage medium of the information search apparatus.

FIG. 4 shows the structure of the CD-ROM 205. A storage area 500 of the CD-ROM 205 of the information search apparatus according to the embodiment of the present invention stores an information search program 501, and an image database 502, matched zone data 503, matched image data 504, radius increment data 505, layout angle data 506, and the like as associated data.

FIG. 5 shows a memory map 600 on the RAM 203, on which the information search program 501, and the image database 502, matched zone data 503, matched image data 504, radius increment data 505, layout angle data 506, and the like as associated data, which are stored in the CD-ROM 205, as shown in FIG. 4, are loaded and are ready to be executed. In the executable state, in addition to the information search program 603, image database 604, matched zone data 605, matched image data 606, radius increment data 607, and layout angle data 608, areas for the similar image buffer 609, similar image information 610, distribution information 611, group information 612, and window information 613 are assured and initialized.

Figure 6:
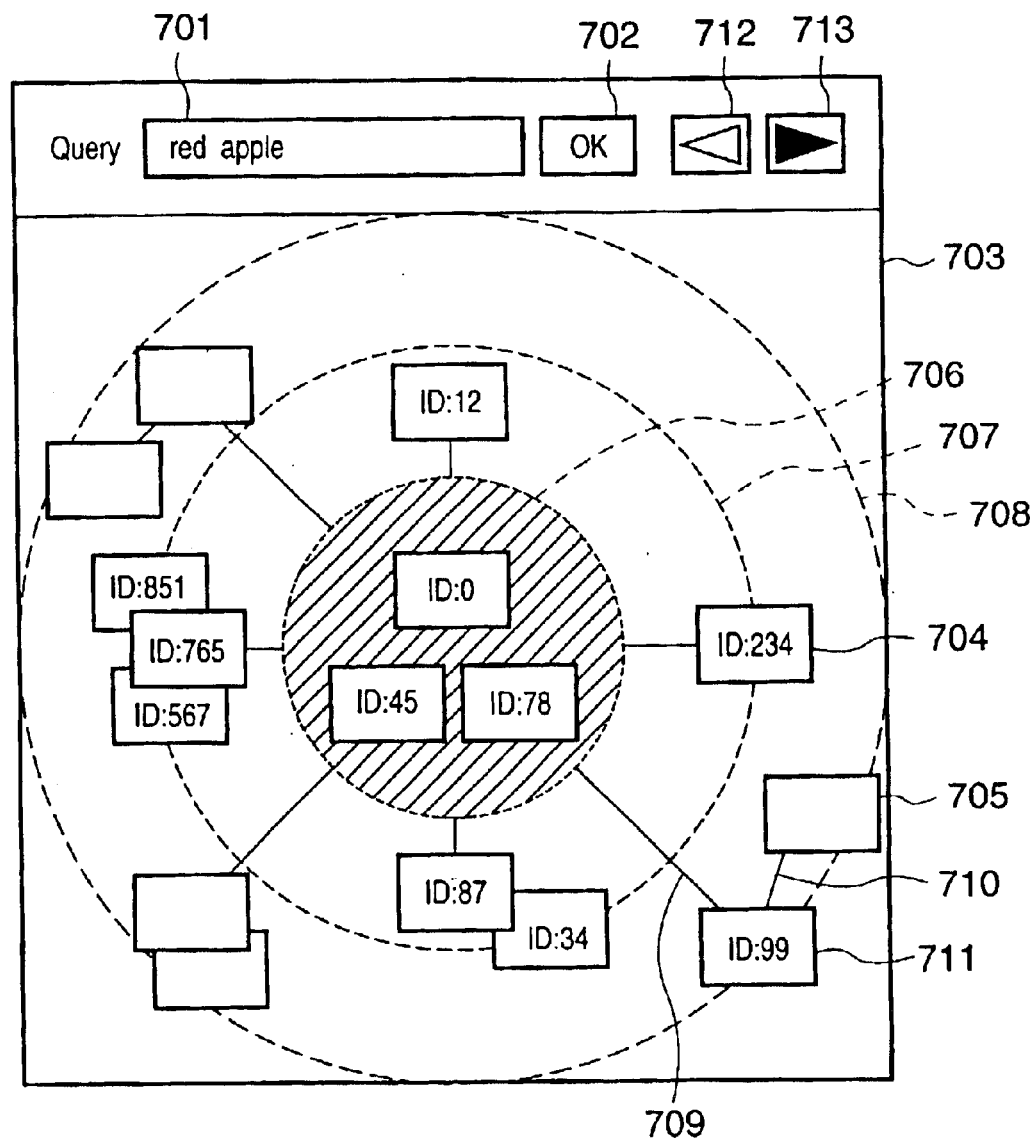
FIG. 6 shows an example of the window configuration of first search results obtained by making a query search of the information search apparatus.
Figure 7:
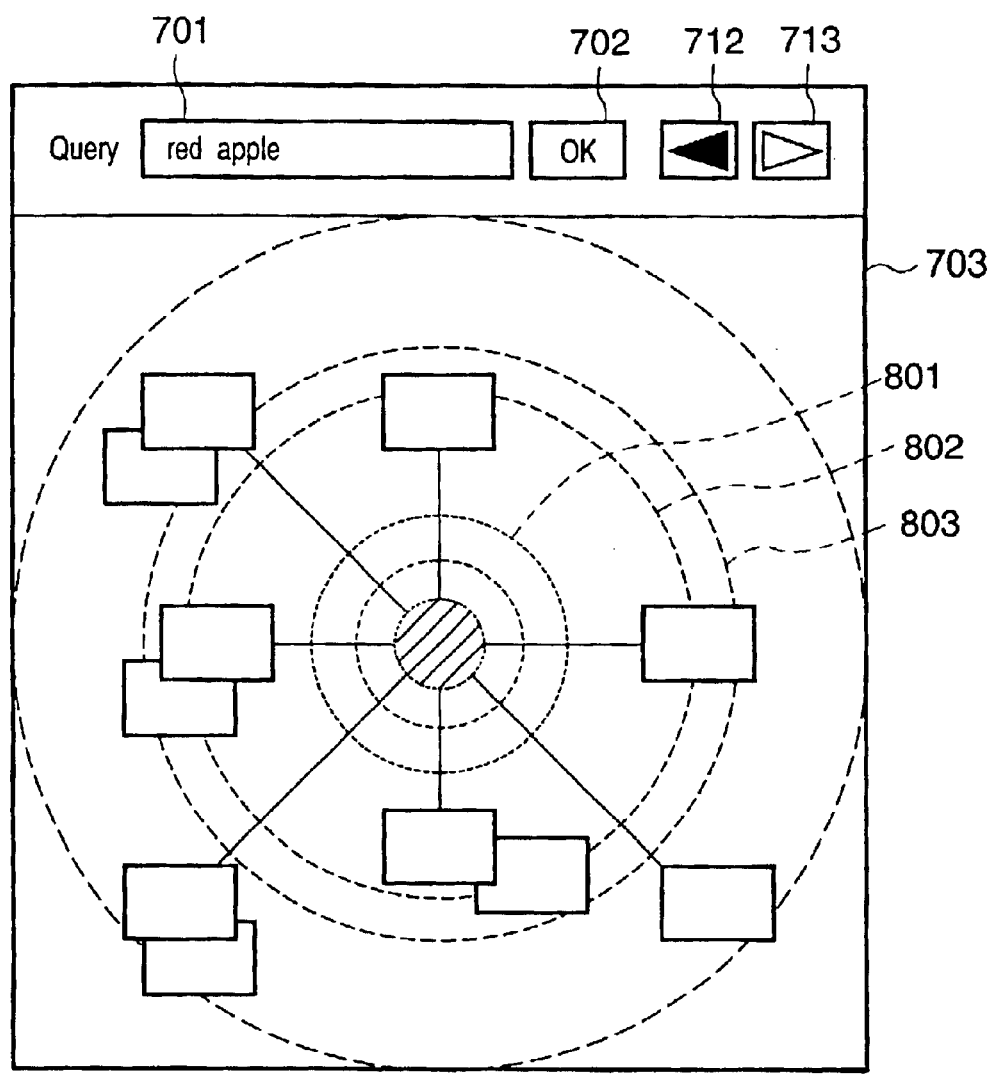
FIG. 7 shows an example of the window of the next search results obtained by making a query search of the information search apparatus.
Figure 8:
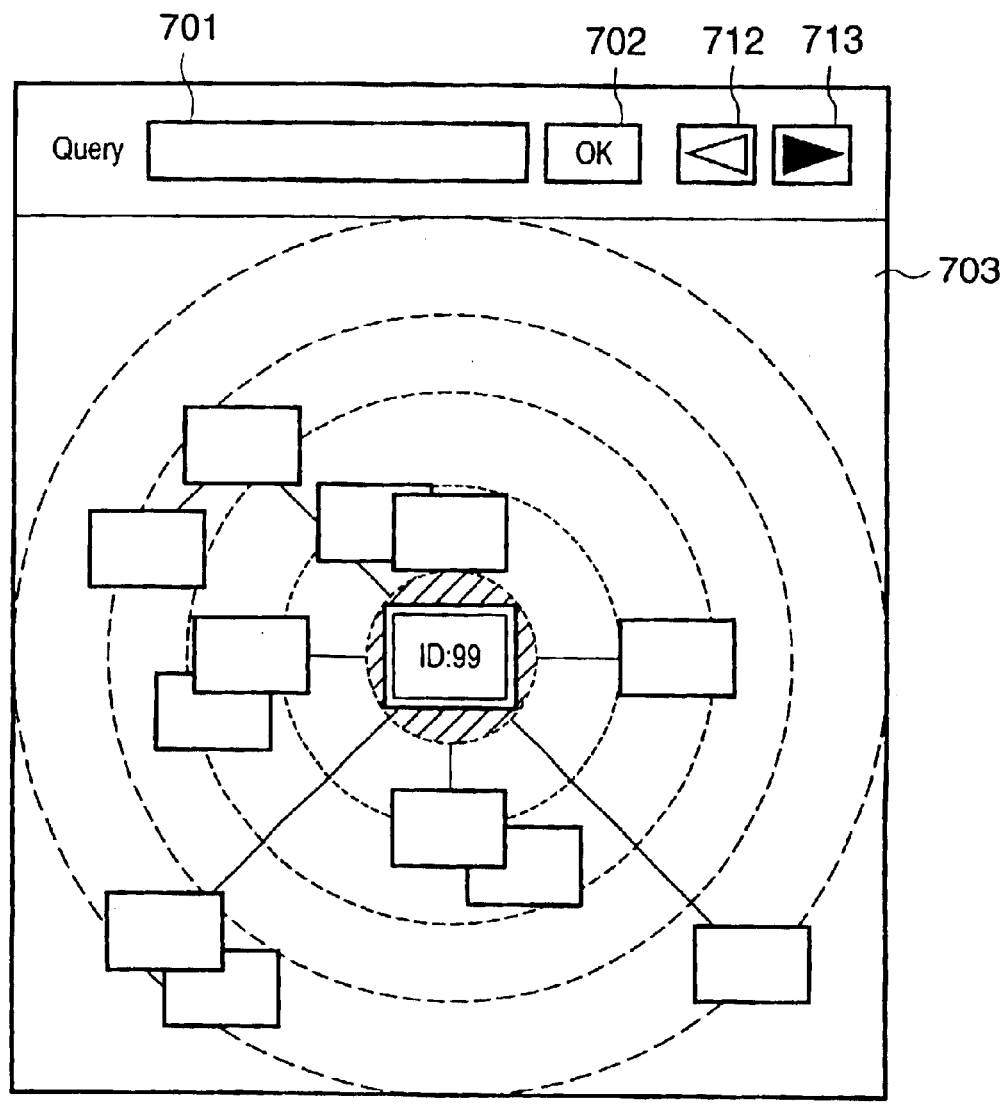
FIG. 8 shows an example of the window configuration of first search results obtained by making a similarity search of the information search apparatus.

FIGS. 6, 7, and 8 are explanatory views showing examples of the window configuration that the information search program 603 displays on the display 208, and operation for making an image search using the information search program 603.

The configuration example shown in FIG. 6 has a query box 701 for inputting a query, and "red apple" is submitted as a query. Also, this configuration has a search button 702 for instructing a search. By clicking the search button 702 using the mouse 209, the image database 604 is searched using the query stored in the query box 701, and search results are displayed on a search result display region 703.

The search result display region 703 is a square region having a size of, e.g., 600 dots (vertical)×600 dots (horizontal). Boxes 704, 705, and the like indicate images found by search. Each image is displayed to have a size of, e.g., 60 dots (vertical)×60 dots (horizontal). In FIGS. 6 to 8, no actual images are displayed for the sake of convenience. A numerical value such as "ID: 234" in, e.g., the box 704 indicate that the image ID of that image is "234". A hatched circular zone 706 is a matched zone that displays images which fully satisfy the query condition. Images displayed within the matched zone 706 fully satisfy the query condition.

Broken line circles 707 and 708 are scale marks indicating the levels to which the query condition is satisfied. In this embodiment, the level to which the query condition is satisfied is expressed by similarity. When the condition is fully satisfied, the similarity is 1.0; when the condition is not satisfied at all, the similarity is 0. The scale mark 707 indicates a similarity value=0.9, and the scale mark 708 a similarity value=0.8. In the matched zone, the similarity is 1.0. In this embodiment, scale marks are displayed in 0.1 increments of similarity. As can be seen from the above description, the similarity lowers as the distance from the center of the search result display region 703 increases. That is, images which the query condition to satisfy higher levels are displayed at positions closer to the center of the search result display region 703, and images which the query condition to satisfy lower levels are displayed at positions farther from the center of the search result display region 703.

Images with image IDs "567", "765", and "851" are displayed to slightly overlap each other. Such overlapping display indicates that these images are similar to each other, and form one group. Images 705 and 711 are connected by a straight line 710. This straight line will be referred to as a grouping line hereinafter. In this manner, images which do not overlap each other but are connected by the straight line form one group. In each group, a straight line extends from one image toward the center of the search result display region 703. This straight line will be referred to as a representative line hereinafter. An image having a representative line will be referred to as a representative image hereinafter.

For example, the image 711 is a representative image, and has a representative line 709. The representative image has the highest similarity among the group. In each group, the distance between the centers of the representative image and another image indicates similarity with the representative image. When images have high similarity with the representative image, such images are displayed to overlap each other without displaying any grouping lines, like images with image IDs "567", "765", and "851". As exemplified by the image 704, even one image can form a group, and a representative line is displayed for the group. A previous window button 712 is used to display images with higher similarity values than those displayed on the search result display region 703.

Since FIG. 6 shows the first search result display region 703 upon making a search using the query "red apple", there are no images having higher similarity values than those displayed here, and a triangle mark of the previous window button 712 is displayed in white. A next window button 713 is used to display images having lower similarity values than those displayed on the search result display region 703. Since the next window is available, a triangle mark of the next window button 713 is displayed in black.

FIG. 7 shows the state of the display 208 after the next window button 713 is clicked using the mouse 209 in the state shown in FIG. 6. Scale marks 801, 802, and 803 respectively indicate similarity values=0.8, 0.7, and 0.6. The distance between the scale marks 802 and 803 is smaller than that between the scale marks 801 and 802, since no images are displayed in a zone between these scale marks. The graduation intervals and the size of the matched zone displayed inside the scale mark 801 are smaller than those in FIG. 6, since no images are displayed there. The triangle mark of the previous window button 712 is displayed in black since there are images with higher similarity values than those in FIG. 7, but the triangle mark of the next window button 713 is displayed in white since there are no images with lower similarity values than those in FIG. 7.

FIG. 8 shows the state of the display 208 after the image 711 is clicked using the mouse 209 in the state shown in FIG. 6. When an image displayed on the search result display region 703 is clicked using the mouse 209, images similar to the clicked image are searched for, and the search results are displayed on the search result display region 703. Since there is no query for search results, the contents of the query box 701 are cleared. Instead, the matched zone displays the image 711 as a query source or an example. In this case, the image 711 is displayed within a double frame to be distinguished from that obtained by a query search. The graduation intervals of the scale marks are smaller than those in the state shown in FIG. 6.

FIG. 9 is an explanatory view showing the structure of the image database 604 loaded on the RAM 203. The image database 604 stores a plurality of items each of which includes an image ID, and an image file name and comment corresponding to the image ID. For example, an image ID "0", image file "000000.jpg", and comment "a red apple" are stored in one item.

The image ID is a number for identifying an image stored in the image database, and numbers are assigned in ascending order from zero to images in the order they were stored in the image database. Hence, the maximum value of the image ID stored in the image database equals a value obtained by subtracting "1" from the number of images stored in the image database. The image file is information indicating the file storage location of image data registered in the image database. Hence, by obtaining image data from the image file, an image can be displayed on the display 208. The comment verbally explains a corresponding image, and the information search program 603 searches the image database 604 for a desired image using this command. The respective items are sorted in ascending order of image ID.

Figure 10:
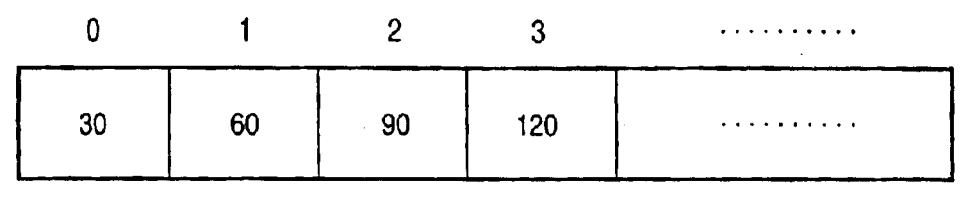

FIG. 10 is an explanatory view showing the structure of the matched zone data 605 loaded on the RAM 203. The matched zone data 605 stores data for changing the size of the matched zone (e.g., 706 shown in FIG. 6) in correspondence with the number of images displayed on the matched zone. As shown in FIG. 10, the matched zone data is a linear sequence, the numbers of images displayed on the matched zone correspond to suffices of the sequence, and the numbers of dots of the radius of the matched zone are stored as elements of the sequence. The relationship between the number of images displayed on the matched zone and the radius size of the matched zone is determined in advance so that images can be displayed on the matched zone without overlapping each other.

For example, as can be seen from FIG. 10, when the number of images displayed on the matched zone is zero, the radius of the matched zone is 30 dots; when it is "1", 60 dots; when it is "2", 90 dots; and when it is "3", 120 dots.

FIG. 11 is an explanatory view showing the structure of the matched image data 606 loaded on the RAM 203. The matched image data 606 stores pairs of coordinate values of the centers of images having a similarity value=1.0 to be displayed within the matched zone 706 in FIG. 6 in correspondence with the number of images displayed within the matched zone. That is, pairs of coordinate values are stored in correspondence with the number of images to be displayed within the matched zone. For example, when one image is displayed within the matched zone, a pair of coordinate values are stored; when two images are displayed, two pairs of coordinate values; and when three images are displayed, three pairs of coordinate values. Each pair of coordinate values store values determined when the center of the matched zone is used as the origin, and x- and y-axes are defined to respectively agree with the horizontal direction on the right side and the vertical direction on the upper side on the window. The coordinate values of images are determined in advance so that images can be displayed on the matched zone without overlapping each other.

For example, as can be seen from FIG. 11, the matched image data 606 stores information so that when one image is displayed on the matched zone 706, it is displayed at a coordinate position (0, 0); when two images are displayed, they are displayed at coordinate positions (0, 35) and (0, −35); when three images are displayed, they are displayed at coordinate positions (0, 35), (0, −35), and (−45, −35).

FIG. 12 is an explanatory view showing the structure of the radius increment data 607 loaded on the RAM 203. The radius increment data 607 is used to determine the graduation interval between the scale marks (707, 708, and the like in FIG. 6). The graduation interval between the scale marks is determined by the number of images to be displayed between the two scale marks. Hence, the radius increment data 607 stores a plurality of items each of which includes the number of images to be displayed between neighboring scale marks and the graduation interval between the scale marks in correspondence with each other. These items are sorted in ascending order of the number of images. As the graduation interval between the scale marks, a radius increment from a scale mark which is 0.1 larger than a target scale mark is stored as the number of dots.

For example, as can be seen from FIG. 12, when the number of images is zero, a scale mark whose radius is increased by 30 dots is displayed; when the number of images ranges from 1 to 4, a scale mark whose radius is increased by 60 dots is displayed; and when the number of images ranges from 5 to 10, a scale mark whose radius is increased by 90 dots is displayed.

Figure 13:
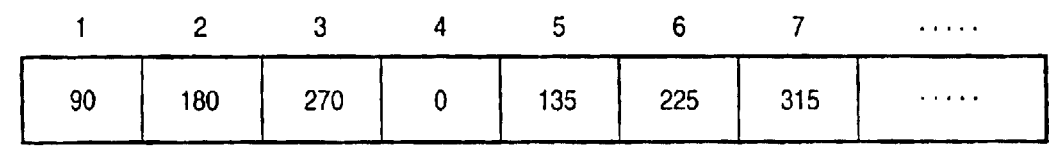

FIG. 13 is an explanatory view showing the structure of the layout angle data 608 assured on the RAM 203. The layout angle data 608 is used to determine the position of a representative image displayed on the search result display region. The layout angle data 608 specifies an angle at which a representative image is displayed when an angle in the horizontal direction on the right side with respect to the center of the search result display region as an origin is 0°. The layout angle data 608 is a linear sequence, and stores angles at which representative images are displayed in correspondence with the display order of representative images from the beginning of the sequence.

For example, as can be seen from FIG. 13, the first representative image is displayed in a direction of 90°; the second image, 180°; the third image, 270°; and the fourth image, 0°.

FIG. 14 is an explanatory view showing the structure of the similar image buffer 609 assured on the RAM 203. The similar image buffer 609 stores the search results of the image database 604. The buffer 609 stores one image as a search result in correspondence with its image ID and similarity. Images found by search or retrieved images are stored in descending order of similarity. As described above, similarity assumes a value ranging from 1.0 to 0: a larger value indicates higher similarity, and 1.0 indicates a perfect match.

For example, as can be seen from FIG. 14, three images with image IDs "0", "456", and "789" are found by search to have a similarity value=1.0, and an image with an image ID "123" is found by search to have a similarity value= 0.952.

FIG. 15 is an explanatory view showing the structure of the similar image information 610 assured on the RAM 203. Similarity values of each of all images stored in the image database 604 with other images are calculated, and the calculated similarity values are stored as a similarity image list in correspondence with that image. As shown in FIG. 15, the similar image lists are stored in ascending order of image ID, i.e., in turn from a similar image list corresponding to image ID "0" from the beginning of the similar image information. The structure of each similar image list is the same as that of the similar image buffer 609 shown in FIG. 14.

Figure 16:
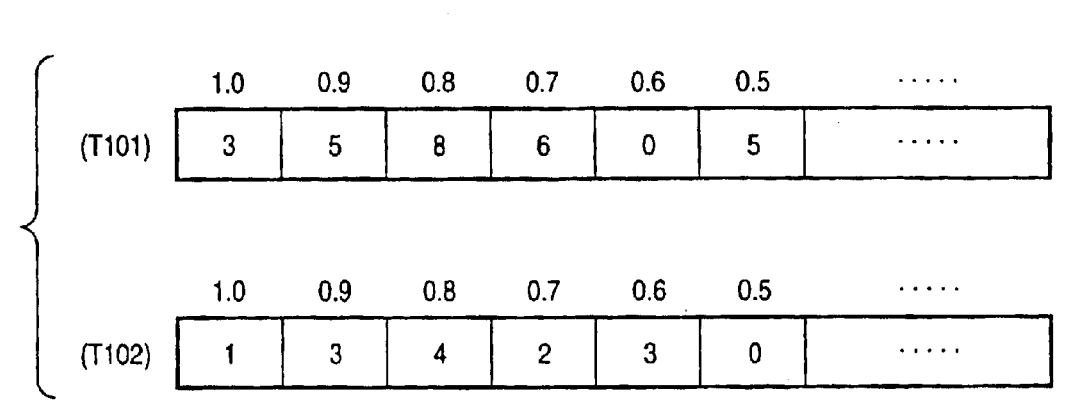

FIG. 16 is an explanatory view showing the structure of the distribution information 611 assured on the RAM 203. The distribution information 611 stores the distribution of the numbers of images present in zones between neighboring scale marks upon displaying search results. (T101) and (T102) respectively indicate the distribution information obtained when a search is made using the query "red apple", and the distribution information obtained when images similar to the image ID "999" are searched for. As can be seen from (TI01), there are three images having a similarity value=1.0, five images having similarity falling within the range from 1.0 (exclusive) to 0.9 (inclusive), and eight images having similarity falling within the range from 0.9 (exclusive) to 0.8 (inclusive).

FIG. 17 is an explanatory view showing the structure of the group information 612 assured on the RAM 203. The group information 612 is used to group images. Images stored in the group information 612 are other than the representative image. That is, the group information 612 stores the image ID of a given image, the image ID of a representative image of the group to which that image belongs, and the similarity between that image and the representative image, in correspondence with each other.

For example, as can be understood from FIG. 17, an image with an image ID "345" belongs to a group having a representative image with an image ID "876", and similarity between the image with the image ID "345" and the representative image with the image ID "876" is 0.928. The group information 612 stores image information in ascending order of representative image ID.

FIGS. 18 and 19 are explanatory views of the window information 613 assured on the RAM 203. The window information 613 stores information of each window to be displayed on the search result display region with respect to search results, and the number of windows required for displaying all search results, the range of the scale marks to be displayed on each window, the layout of the scale marks on each window, and the like can be obtained based on this information. (T201) and (T202) respectively indicate the window information obtained when a search is made using the query "red apple", and the window information obtained when images similar to the image ID "999" are searched for.

The window information 613 stores suffixes of the sequence of the distribution information 611 to indicate display start images, and scale mark widths of the scale marks in units of windows in correspondence with each other. The scale mark width of the scale mark stores the intervals with the neighboring scale marks, i.e., differences of radii in terms of the number of dots in turn from the radius of the matched zone, i.e., the scale mark of a similarity value=1.0. "−1" is stored in the scale marks which are not displayed on the corresponding window.

For example, as can be seen from (T201), the first window starts display from an image corresponding to suffix 0 of the sequence of the distribution information 611, i.e., an image with a similarity value=1.0. Also, on the first window, the radius of the matched zone is 120 dots, the radius of the scale mark indicating a similarity value=0.9 is larger by 90 dots than that of the matched zone, the radius of the scale mark indicating a similarity value=0.8 is larger by 90 dots than that of the scale mark indicating a similarity value=0.9, and scale marks indicating a similarity value=0.7 and smaller are not displayed. Furthermore, the next window starts display from an image corresponding to suffix 3 of the sequence of the distribution information 611, i.e., an image with similarity smaller than 0.8.

The operation of the information search program 501 will be described below with reference to the flow chart in FIG. 20.

The information search program 501, and the image database 502, matched zone data 503, radius increment data 505, and layout angle data 506 as associated data of the program 501, which are stored in the CD-ROM 205, are loaded from the CD-ROM drive 204 onto the RAM 203. Furthermore, areas for the similar image buffer 609, similar image information 610, distribution information 611, group information, and window information 613 are assured on the RAM 203 (step S2001).

The control is then passed to the information search program 501. The information search program 501 executes initialization required for making a search (step S2002). More specifically, the image database 604 is searched to find images similar to each of all images stored therein, and the search results are stored in the similar image information 610. Note that this process will be described in detail later with reference to FIG. 21.

In step S2003, the process branches in correspondence with an event generated. More specifically, if an event of pressing a character key using the keyboard 207 is generated, the flow branches to step S2004. On the other hand, if an event of clicking the OK button 702 shown in FIG. 6 using the mouse 209 is generated, the flow branches to step S2005. On the other hand, if an event of clicking the image 704, 705, or the like shown in FIG. 6 using the mouse 209 is generated, the flow branches to step S2006. If an event of clicking the next window button 712 shown in FIG. 6 using the mouse 209 is generated, the flow branches to step S2007. Furthermore, if an event of clicking the previous window button 713 shown in FIG. 6 using the mouse 209 is generated, the flow branches to step S2008.

Step S2004 is a process executed when a query is input. A character corresponding to the key pressed in step S2003 is fetched, and is displayed in the query box 701 shown in FIG. 6. Upon completion of this process, the flow returns to step S2003.

Step S2005 is a process executed when a search using the query displayed in the query box 701 is instructed. In step S2005, the flow branches depending on if the query is input to the query box 701. If characters are present in the query box 701, since an image search can be made using a query, the flow advances to step S2009 to make a search using the query. After that, the flow returns to step S2003. If no characters are present in the query box, since an image search cannot be made using a query, the flow advances to step S2010 to randomly select an image to be used in a search. Then, the flow advances to step S2011.

Step S2006 is a process executed when a search using a specific image as an example image is instructed. In this step, an image ID corresponding to the clicked image is obtained, and is stored in a query image ID. The query image ID is assured in the RAM 203. Upon completion of this process, the flow advances to step S2011.

Step S2007 is a process executed when display of the next window of search results is instructed. This process will be described in detail later using FIG. 24. Upon completion of this process, the flow returns to step S2003.

Step S2008 is a process executed when display of the previous window of search result is instructed. This process will be described in detail later using FIG. 25. Upon completion of this process, the flow returns to step S2003.

Step S2009 is a process for searching the image database 604 using a character string stored in the query box 701, and displaying search results on the display 208. This process will be described in detail later using FIG. 22. Upon completion of this process, the flow returns to step S2003.

In step S2010, an image is randomly selected from the image database 604, and an image ID corresponding to the selected image is stored in a query image ID. The query image ID is assured in the RAM 203. Upon completion of this process, the flow advances to step S2011.

In step S2011, images similar to the image selected in step S2006 or S2010 are displayed on the display 208. Since similar images have already been stored in the similar image buffer 609 in step S2006 or S2010, no special process for searching for similar images is done. This process will be described in detail later using FIG. 23. Upon completion of this process, the flow returns to step S2003.

Figure 20:
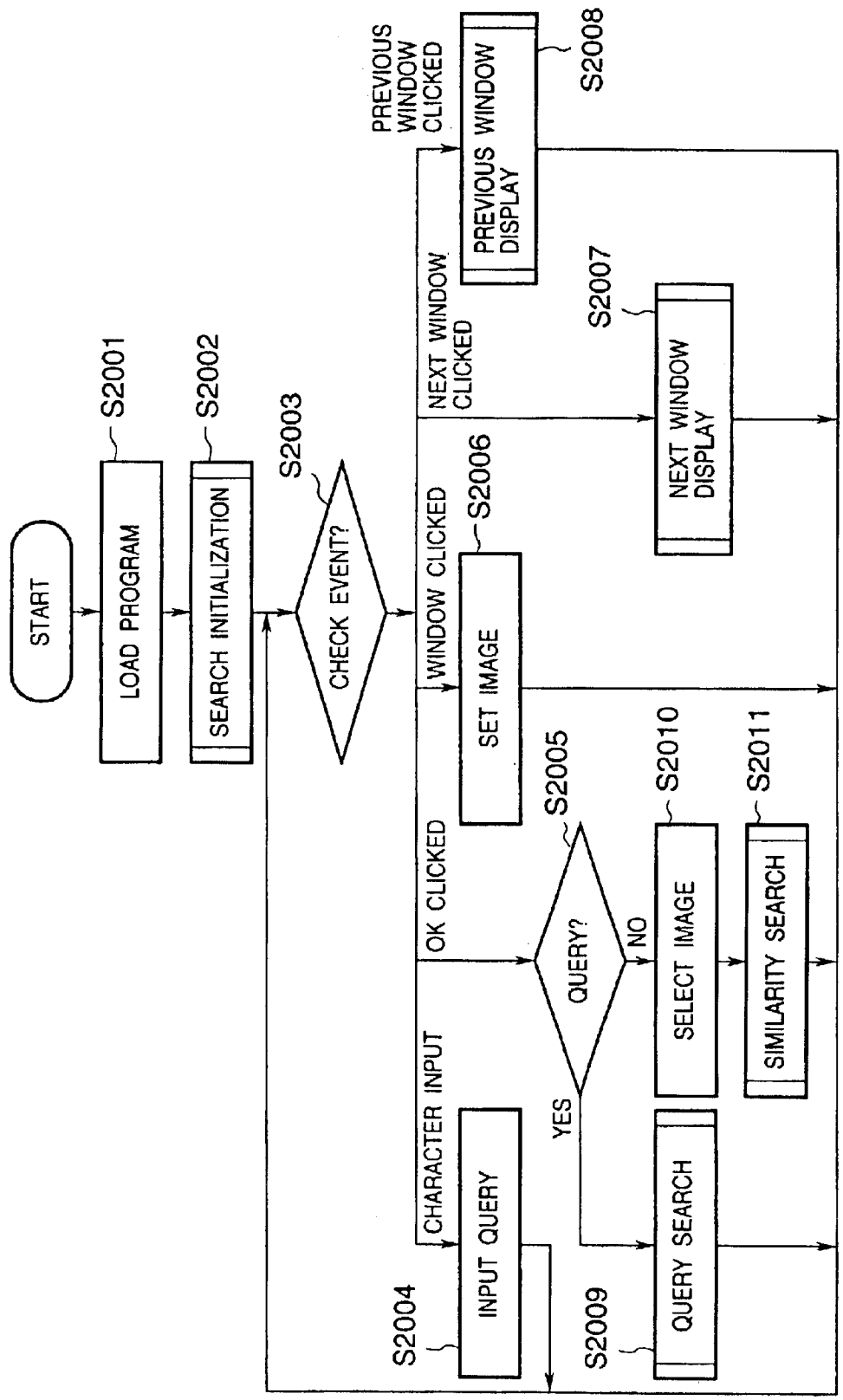
FIG. 20 is a flow chart showing the flow of an information search process of the information search apparatus.
Figure 21:
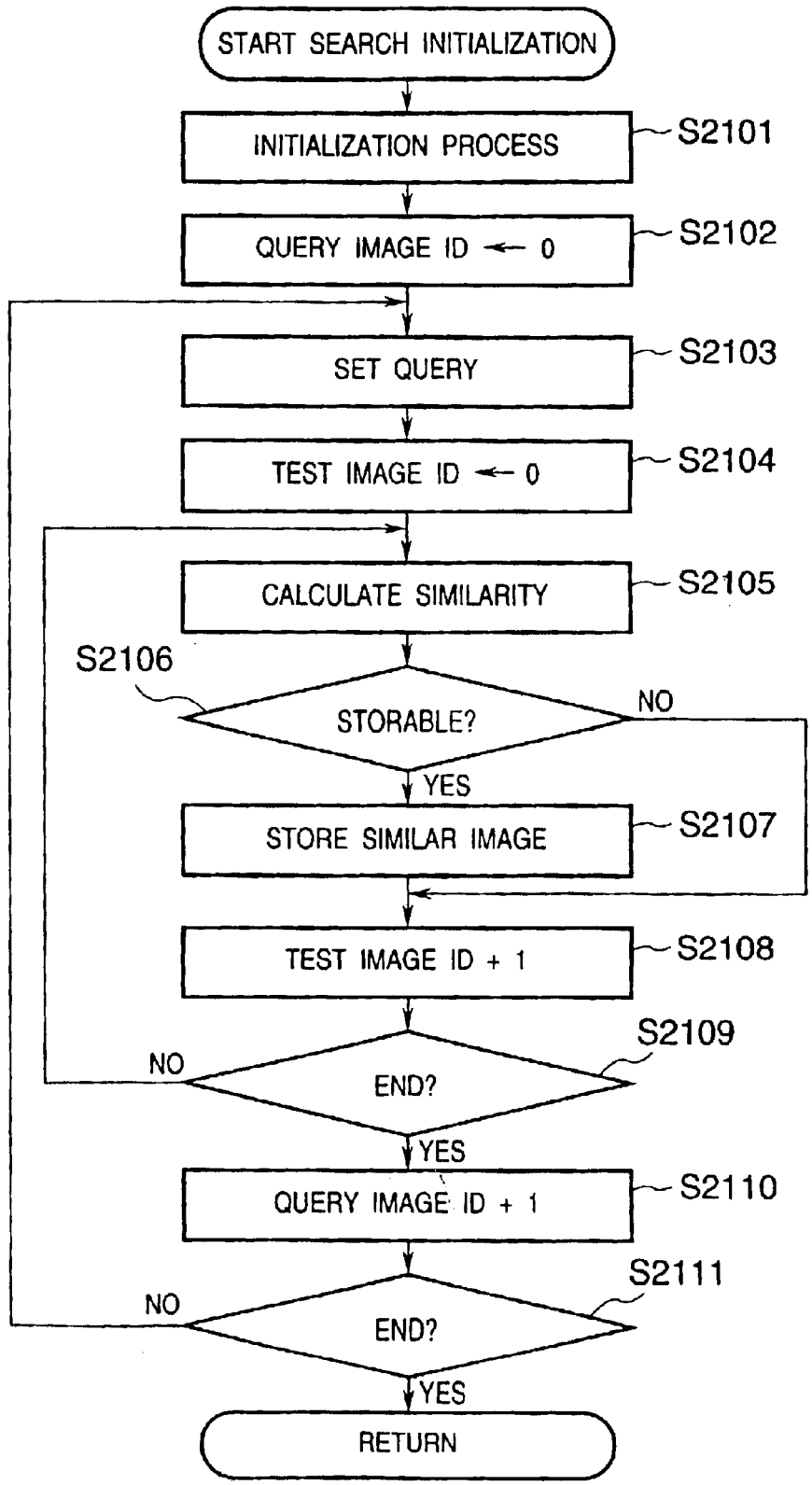
FIG. 21 is a flow chart showing the flow of a search initialization process of the information search apparatus.

FIG. 21 is a flow chart showing the flow of the search initialization process in step S2002 in FIG. 20. In this process, various initializations are made. Also, the image database 604 is searched to find images similar to each of all images stored therein, and the search results are stored in the similar image information 610. This process will be described in detail below.

In step S2101, various initialization processes are done. That is, various kinds of information such as the similar image buffer 609, similar image information 610, distribution information 611, group information 612, window information 613, and the like assured on the RAM 203 are initialized. Also, other initializations are made as needed. Upon completion of this process, the flow advances to step S2102.

In step S2102, an initial value "0" is stored in the query image ID indicating a query image. The query image ID is assured on the RAM 203. Upon completion of this process, the flow advances to step S2103.

In step S2103, a comment of the query image is stored in a query buffer to search for images similar to the query image. A comment corresponding to the query image ID is extracted from the image database 604, and is copied to the query buffer. The query buffer is assured on the RAM 203. Upon completion of this process, the flow advances to step S2104.

In step S2104, an initial value "0" is stored in a test image ID indicating a test image. The test image ID is assured on the RAM 203. Upon completion of this process, the flow advances to step S2105.

In step S2105, the similarity between an image indicated by the query image ID and an image indicated by the test image ID is calculated. The similarity is calculated based on a comment for the image corresponding to the query image ID, and a comment for the image corresponding to the test image ID. The comment for the image corresponding to the query image ID is stored in the query buffer. The comment for the image corresponding to the test image ID can be extracted from the image database 604. Since a method of calculating similarity between two texts is generally used in the field of information search, a detailed description thereof will be omitted. In this case, the calculation result is normalized to obtain a maximum value "1.0" or a minimum value "0.0" of similarity. After the similarity is calculated, the flow advances to step S2106.

Step S2106 is a process which branches based on the result of checking if the image indicated by the test image ID can be stored in the similar image buffer 609. If the similar image buffer 609 is not full of data, it is unconditionally determined that the image can be stored. On the other hand, if the similar image buffer 609 is full of data, the similarity value of an item at the end of the similar image buffer 609 is compared with the similarity value calculated in step S2105. If the similarity value calculated in step S2105 is larger than the stored value, it is determined that the image can be stored; otherwise, it is determined that the image cannot be stored. If it is determined that the image can be stored, the flow advances to step S2107; otherwise, the flow advances to step S2108.

Step S2107 is a process for storing the test image ID in the similar image buffer 609 in correspondence with the similarity calculated in step S2105. In this case, similarity is stored so that the respective items in the similar image buffer 609 are sorted in descending order of similarity. If the similar image buffer 609 is full of data, an item at the end of the similar image buffer 609 is discarded. Upon completion of this process, the flow advances to step S2108.

Step S2108 is a process for counting up the value of the query image by "1" and updating the test image to the next image in the database 604. After completion of this step, the flow advances to step S2109.

Step S2109 is a process which branches based on the result of checking if the query image has been compared with all images in the image database 604. If the value of the test image ID is larger than that of the end image ID stored in the image database 604, since all the images have already been compared, the flow advances to step S2110. On the other hand, if the value of the test image ID is not larger than that of the end image ID stored in the image database 604, the flow returns to step S2105.

Step S2110 is a process for incrementing the value of the query image ID by "1" to select the next image in the image database 604 as the query image. Upon completion of this process, the flow advances to step S2111.

Step S2111 is a process which branches based on the result of checking if similar images have been obtained for all the images in the image database 604. If the value of the query image ID is larger than that of the end image ID stored in the image database 604, since the processes have been done for all the images, this processing ends. On the other hand, if the value of the query image ID is not larger than that of the end image ID stored in the image database 604, the flow returns to step S2103.

Figure 22:
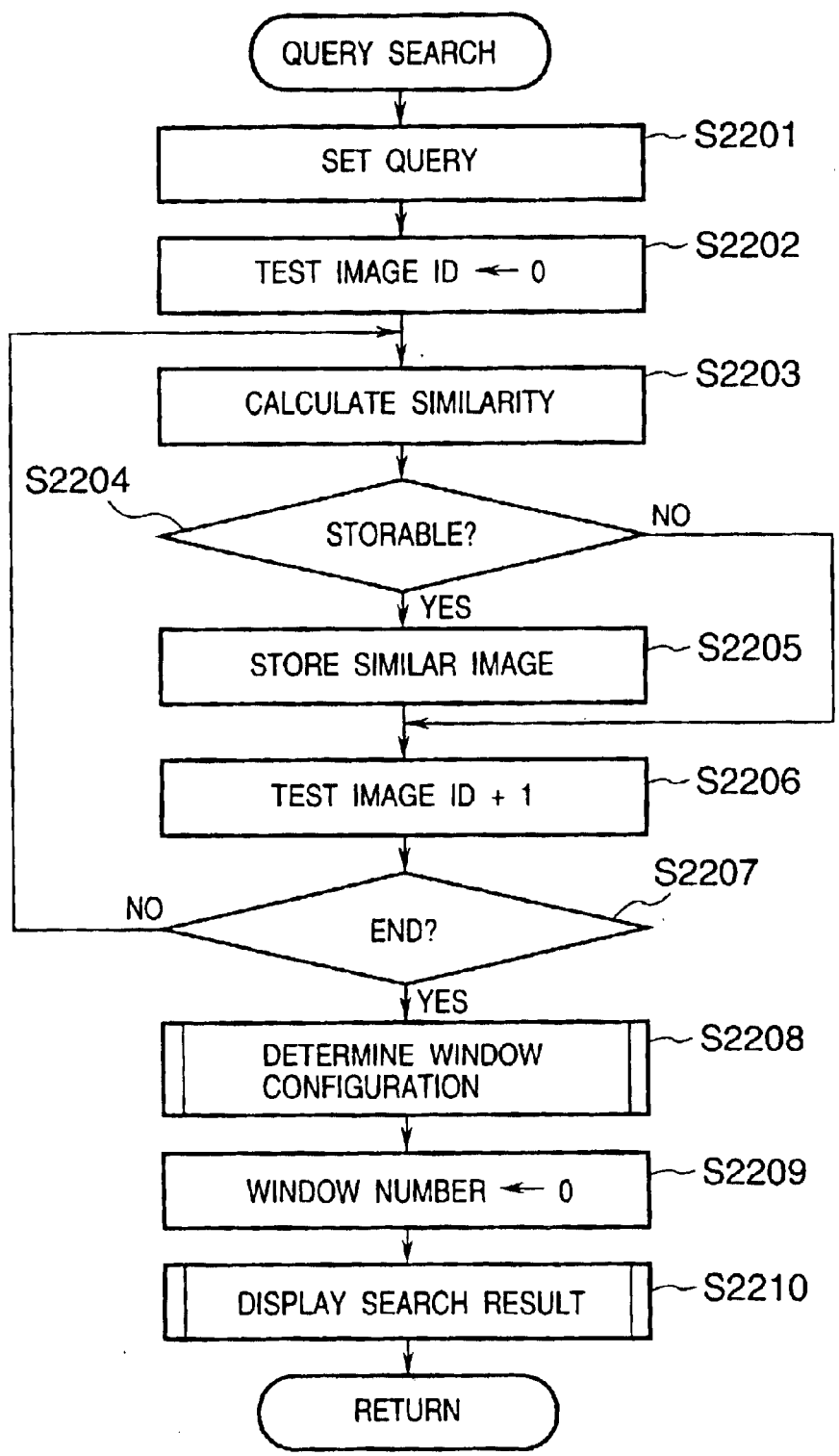
FIG. 22 is a flow chart showing the flow of a query search process of the information search apparatus.

FIG. 22 is a flow chart showing the flow of the query search process in step S2009 in FIG. 20. In this process, the image database 604 is searched using the query stored in the query box 701, and the search results are displayed on the display 208. This process will be described in detail below.

In step S2201, a character string stored in the query box 701 is copied to the query buffer. The query buffer is assured on the RAM 203. Upon completion of this process, the flow advances to step S2202.

In step S2202, an initial value "0" is stored in the test image ID indicating a test image. The test image ID is assured on the RAM 203. Upon completion of this process, the flow advances to step S2203.

In step S2203, the similarity between a comment stored in the query buffer and a comment for an image corresponding to the test image ID is calculated. The comment for the image corresponding to the test image ID can be extracted from the image database 604. Since a method of calculating the similarity between two texts is generally used in the field of information search, a detailed description thereof will be omitted. In this case, the calculation result is normalized to obtain a maximum value "1.0" or a minimum value "0.0" of similarity. After the similarity is calculated, the flow advances to step S2204.

Step S2204 is a process that branches based on the result of checking if the image indicated by the test image ID can be stored in the similar image buffer 609. If the similar image buffer 609 is not full of data, it is unconditionally determined that the image can be stored. On the other hand, if the similar image buffer 609 is full of data, the similarity value of an item at the end of the similar image buffer 609 is compared with the similarity value calculated in step S2203. If the similarity value calculated in step S2203 is larger than the stored value, it is determined that the image can be stored; otherwise, it is determined that the image cannot be stored. If it is determined that the image can be stored, the flow advances to step S2205; otherwise, the flow advances to step S2206.

Step S2205 is a process for storing the test image ID in the similar image buffer 609 in correspondence with the similarity calculated in step S2203. In this case, similarity is stored so that the respective items in the similar image buffer 609 are sorted in descending order of similarity. If the similar image buffer 609 is full of data, an item at the end of the similar image buffer 609 is discarded. Upon completion of this process, the flow advances to step S2206.

Step S2206 is a process for incrementing the value of the test image ID by "1" to select the next image in the image database 604 as the test image. Upon completion of this process, the flow advances to step S2207.

Step S2207 is a process that branches based on the result of checking if all images in the image database 604 have been compared with the query. If the value of the test image ID is larger than that of the end image ID stored in the image database 604, since all the images have already been compared, the flow advances to step S2208. On the other hand, if the value of the test image ID is not larger than that of the end image ID stored in the image database 604, the flow returns to step S2203.

Step S2208 is a process for determining the window configuration for displaying search results on the basis of the search results stored in the similar image buffer 609, and outputting the determined window configuration information to the window information 613. This process will be described in detail later using FIG. 26. Upon completion of this process, the flow advances to step S2209.

Step S2209 is a process for substituting "0" in a window number to display the first window of search results. The window number is assured on the RAM 203. Upon completion of this process, the flow advances to step S2210.

Step S2210 is a process for displaying search results on the display 208 on the basis of the window configuration stored in the window information 613 and the search results stored in the similar image buffer 609. This process will be described in detail later using FIG. 29. Upon completion of this process, the processing ends.

Figure 23:
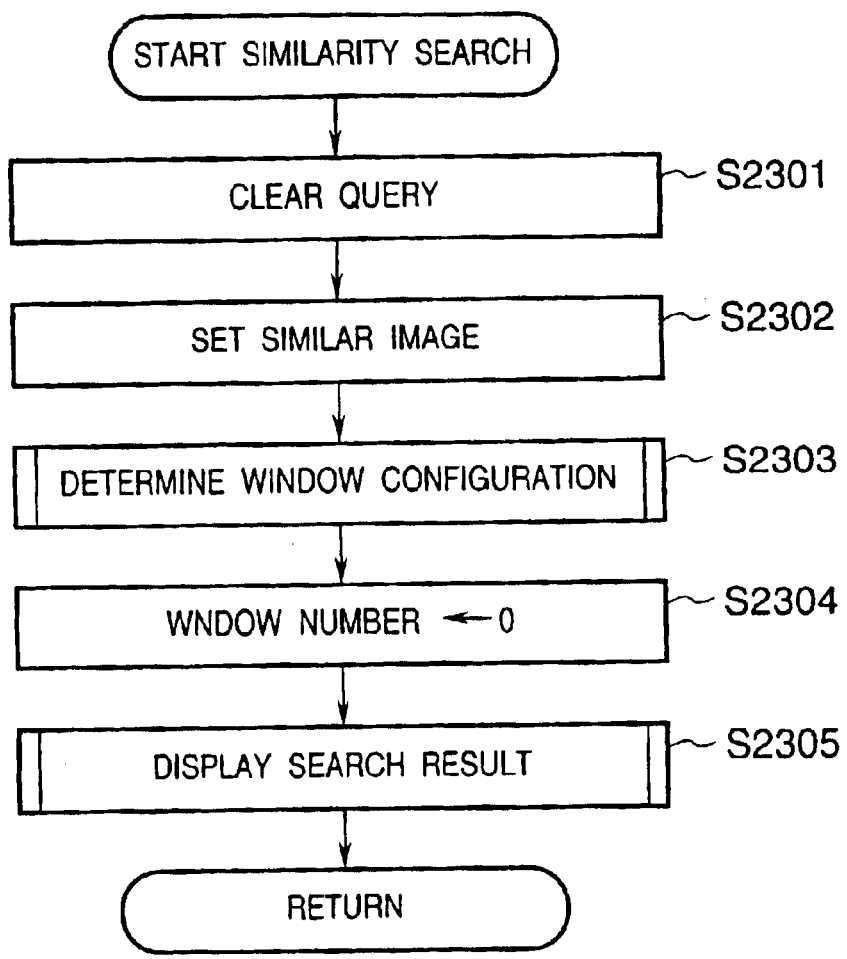
FIG. 23 is a flow chart showing the flow of a similarity search process of the information search apparatus.

FIG. 23 is a flow chart showing the flow of the similar search process in step S2011 in FIG. 20. In this process, images similar to the image stored in the query image ID are extracted from the similar image information 610, and similar images are displayed on the display 208. This process will be described in detail below.

In step S2301, a character string stored in the query buffer is cleared to clear the query box 701, and an empty query box 701 is displayed on the display 208. Upon completion of this process, the flow advances to step S2302.

In step S2302, a similar image list corresponding to the image ID stored in the query image ID is extracted from the similar image information 610, and the contents of the similar image list are copied to the similar image buffer 609. Upon completion of this process, the flow advances to step S2303.

Step S2303 is a process for determining the window configuration for displaying search results on the basis of the search results stored in the similar image buffer 609, and outputting the determined window configuration information to the window information 613. This process will be described in detail later using FIG. 26. Upon completion of this process, the flow advances to step S2304.

Step S2304 is a process for substituting "0" in a window number to display the first window of search results. The window number is assured on the RAM 203. Upon completion of this process, the flow advances to step S2305.

Step S2305 is a process for displaying search results on the display 208 on the basis of the window configuration stored in the window information 613 and the search results stored in the similar image buffer 609. This process will be described in detail later using FIG. 29. Upon completion of this process, the processing ends.

Figure 24:
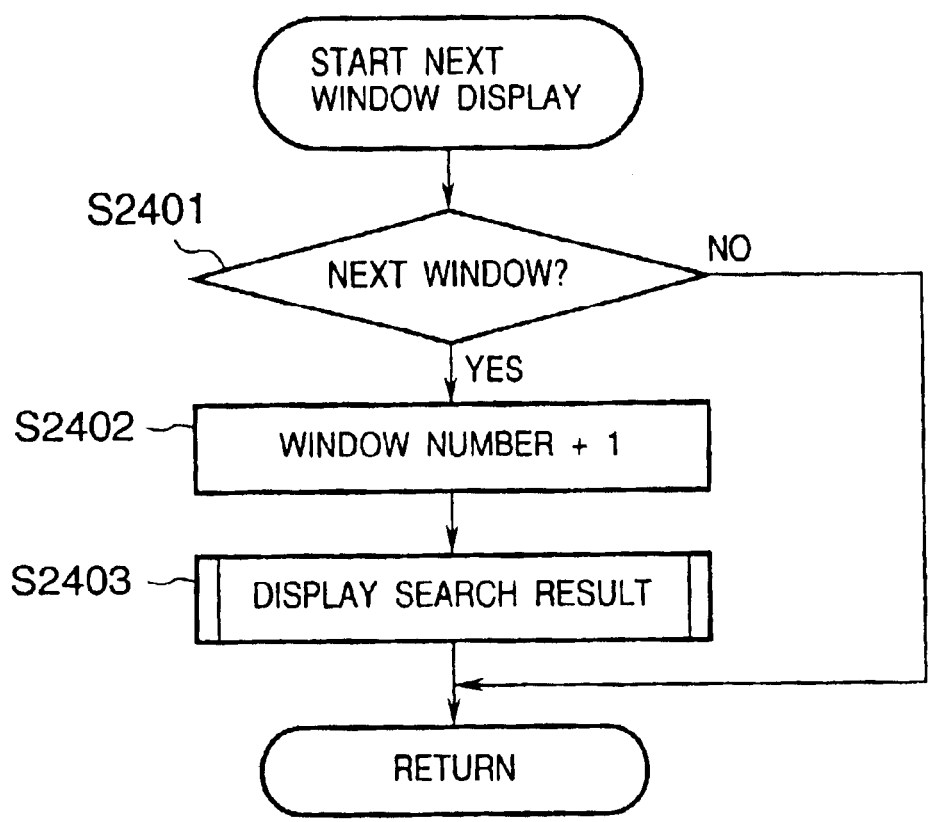
FIG. 24 is a flow chart showing the flow of a next window display process of the information search apparatus.

FIG. 24 is a flow chart showing the flow of the next window display process in step S2007 in FIG. 20. In this process, a window next to that of search results displayed on the display 208 is displayed. This process will be described in detail below.

Step S2401 branches by checking if the next window is present. If an item corresponding to a value obtained by adding "1" to the value stored in the window number is present in the window information 613, it is determined that the next window is present, and the flow advances to step S2402. On the other hand, if an item corresponding to a value obtained by adding "1" to the value stored in the window number is not present in the window information 613, it is determined that the next window is not present, and this processing ends. Whether or not an item corresponding to a value obtained by adding "1" to the value stored in the window number is present in the window information 613 can be determined by checking if the display start value of the corresponding item is "−1". If the display start value of the corresponding item is "−1", it is determined that the next window is not present; otherwise, it is determined that the next window is present.

Step S2402 is a process for adding "1" to the window number to display a window next to the currently displayed window. Upon completion of this process, the flow advances to step S2403.

Step S2403 is a process for displaying search results on the display 208 on the basis of the window configuration stored in the window information 613 and the search results stored in the similar image buffer 609. This process will be described in detail later using FIG. 29. Upon completion of this process, the processing ends.

FIG. 25 is a flow chart showing the previous window display process in step S2008 in FIG. 20. In this process, a window immediately before that of search results displayed on the display 208 is displayed. This process will be described in detail below.

Step S2501 branches by checking if the previous window is present. If the value of the window number is not "0", it is determined that the previous window is present, and the flow advances to step S2502. If the value of the window number is "0", it is determined that the previous window is not present, and this processing ends.

Step S2502 is a process for decrementing the window number by "1" to display a window immediately before the currently displayed window. Upon completion of this process, the flow advances to step S2503.

Step S2503 is a process for displaying search results on the display 208 on the basis of the window configuration stored in the window information 613 and the search results stored in the similar image buffer 609. This process will be described in detail later using FIG. 29. Upon completion of this process, the processing ends.

Figure 26:
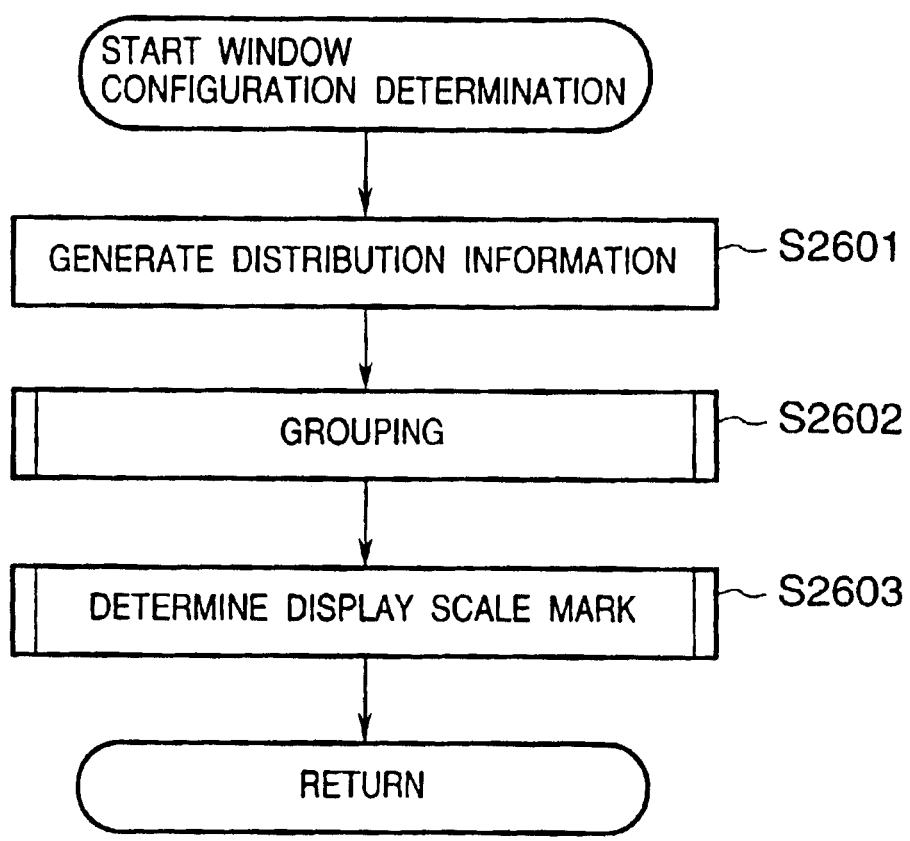
FIG. 26 is a flow chart showing the flow of a window configuration determination process of the information search apparatus.

FIG. 26 is a flow chart showing the flow of the window configuration determination process in step S2208 in FIG. 22 and step S2303 in FIG. 23. In this process, the configuration of windows for displaying search results is determined on the basis of information stored in the similar image buffer 609, and the window configuration information is output to the window information 613. This process will be described in detail below.

In step S2601, the distribution of similarity values of images stored in the similar image buffer 609 is checked, and is stored in the distribution information 611. Initially, the number of image IDs with a similarity value="1.0" is obtained from the similar image buffer 609, and is stored in the distribution information 611. Next, the number of image IDs with similarity falling within the range from "1.0" (exclusive) to "0.9" (inclusive) is obtained from the similar image buffer 609, and is stored in the distribution information 611. Likewise, the number of image IDs stored in the similar image buffer 609 are obtained in "0.1" increments, and are stored in the distribution information 611. Upon completion of this process, the flow advances to step S2602.

Step S2602 is a process for grouping images stored in the similar image buffer 609 in correspondence with their similarity values, and storing the grouping results in the group information 612. This process will be described in detail later using FIG. 27. Upon completion of this process, the flow advances to step S2603.

Step S2603 is a process for determining scale marks displayed on each window, and storing the determined results in the window information 613. This process will be described in detail later using FIG. 28. Upon completion of this process, the processing ends.

Figure 27:
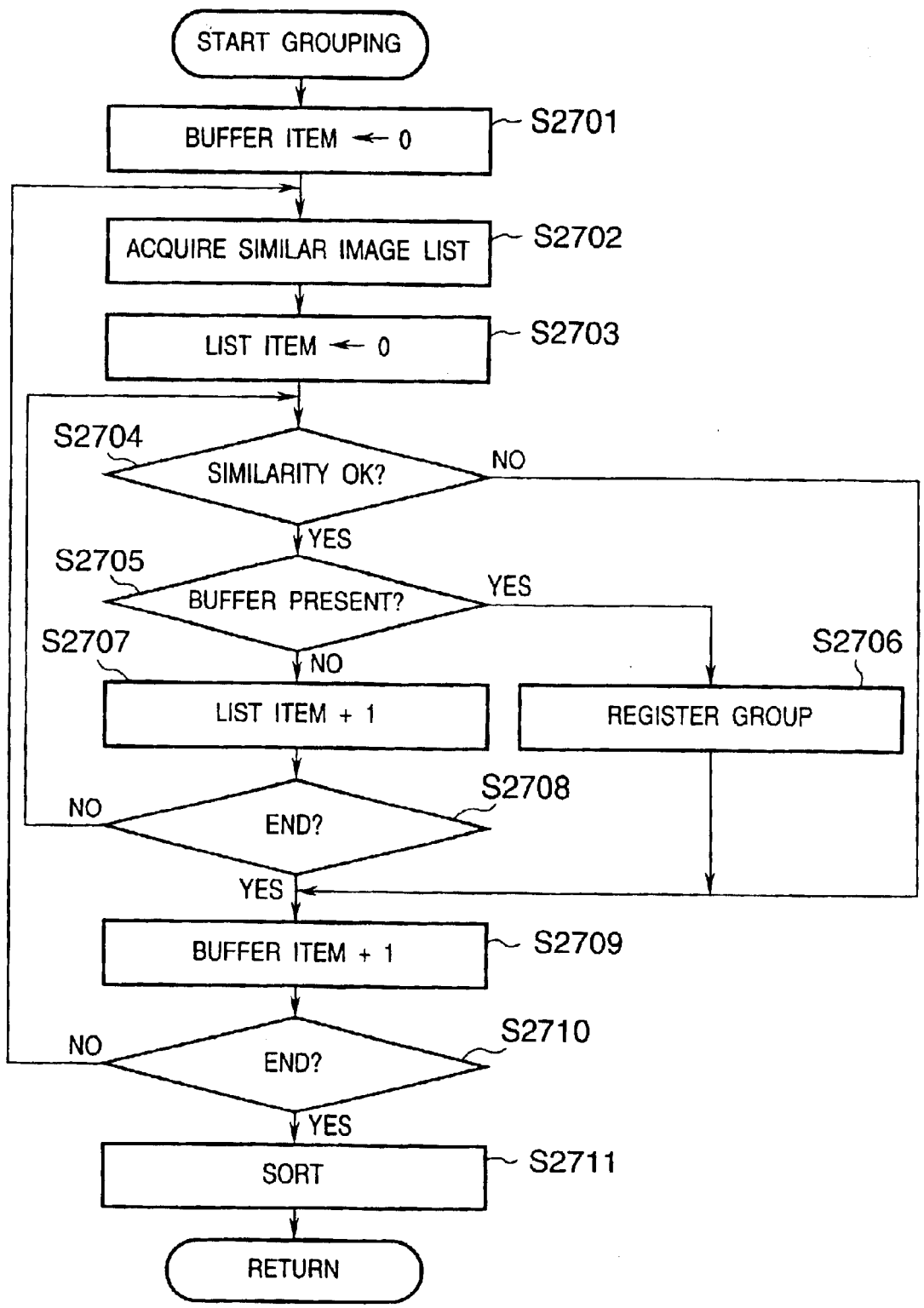
FIG. 27 is a flow chart showing the flow of a grouping process of the information search apparatus.

FIG. 27 is a flow chart showing the flow of the grouping process in step S2602 in FIG. 26. This process will be described in detail below.

In step S2701, "0" is substituted in a buffer item indicating one item in the buffer so that the buffer item indicates the first item in the similar image buffer 609. The buffer item is assured on the RAM 203. Upon completion of this process, the flow advances to step S2702.

In step S2702, a similar image list corresponding to that image ID in the similar image buffer 609, which is indicated by the buffer item, is extracted from the similar image information 610. Since the similar image information 610 is a sequence of similar image lists, and suffices of the sequence indicate image IDs, as shown in FIG. 15, the corresponding similar image list can be easily extracted. Upon completion of this process, the flow advances to step S2703.

In step S2703, "0" is substituted in a list item indicating one item in the similar image list extracted in step S2702 so that the list item indicates the start item in the similar image list. The list item is assured on the RAM 203. Upon completion of this process, the flow advances to step S2704.

In step S2704, the flow branches by checking if the similarity of that item in the similar image list, which is indicated by the list item, is equal to or larger than a prescribed value. If the similarity is equal to or larger than the prescribed value, the flow advances to step S2705; otherwise, the flow jumps to step S2709. Assume that the prescribed value is set at, e.g., "0.8".

In step S2705, the flow branches by checking if an image ID indicated by the list item is present in that item in the similar image buffer 609, which is located on the start side of an item indicated by the buffer item. That is, if an image ID that matches the image ID of that item in the similar image list, which is indicated by the list item, is present in that item in the similar image buffer 609, which corresponds to a value smaller than the value of the buffer item, the flow advances to step S2706; otherwise, the flow advances to step S2707.

In step S2706, a set of the image ID corresponding to the buffer item, the image ID corresponding to the list item, and the similarity corresponding to the list item are stored in the group information 612. In this case, the image ID corresponding to the buffer item is stored in an image ID storage area of the group information 612, the image ID corresponding to the list item is stored in a representative image ID storage area of the group information 612, and the similarity corresponding to the list item is stored in a similarity storage area of the group information 612. Upon completion of this process, the flow advances to step S2709.

In step S2707, the list item value is incremented by "1" to indicate the next item in the similar image list extracted in step S2702. Upon completion of this process, the flow advances to step S2708.

In step S2708, the flow branches by checking if the item indicated by the list item is valid. If the item is invalid, since the process has been done for all valid items in the similar image list extracted in step S2702, the flow advances to step S2709. On the other hand, if the item is valid, since items to be processed still remain, the flow returns to step S2704.

In step S2709, the value of the buffer item is incremented by "1" to indicate the next item in the similar image buffer 609. Upon completion of this process, the flow advances to step S2710.

In step S2710, the flow branches by checking if the item indicated by the buffer item is valid. If the item is invalid, since the process has been done for all valid items in the similar image buffer 609, the flow advances to step S2711. On the other hand, if the item is valid, since items to be processed still remain, the flow returns to step S2702.

In step S2711, valid items stored in the group information 612 are sorted in ascending order of representative image ID value. Upon completion of this process, the processing ends.

Figure 28:
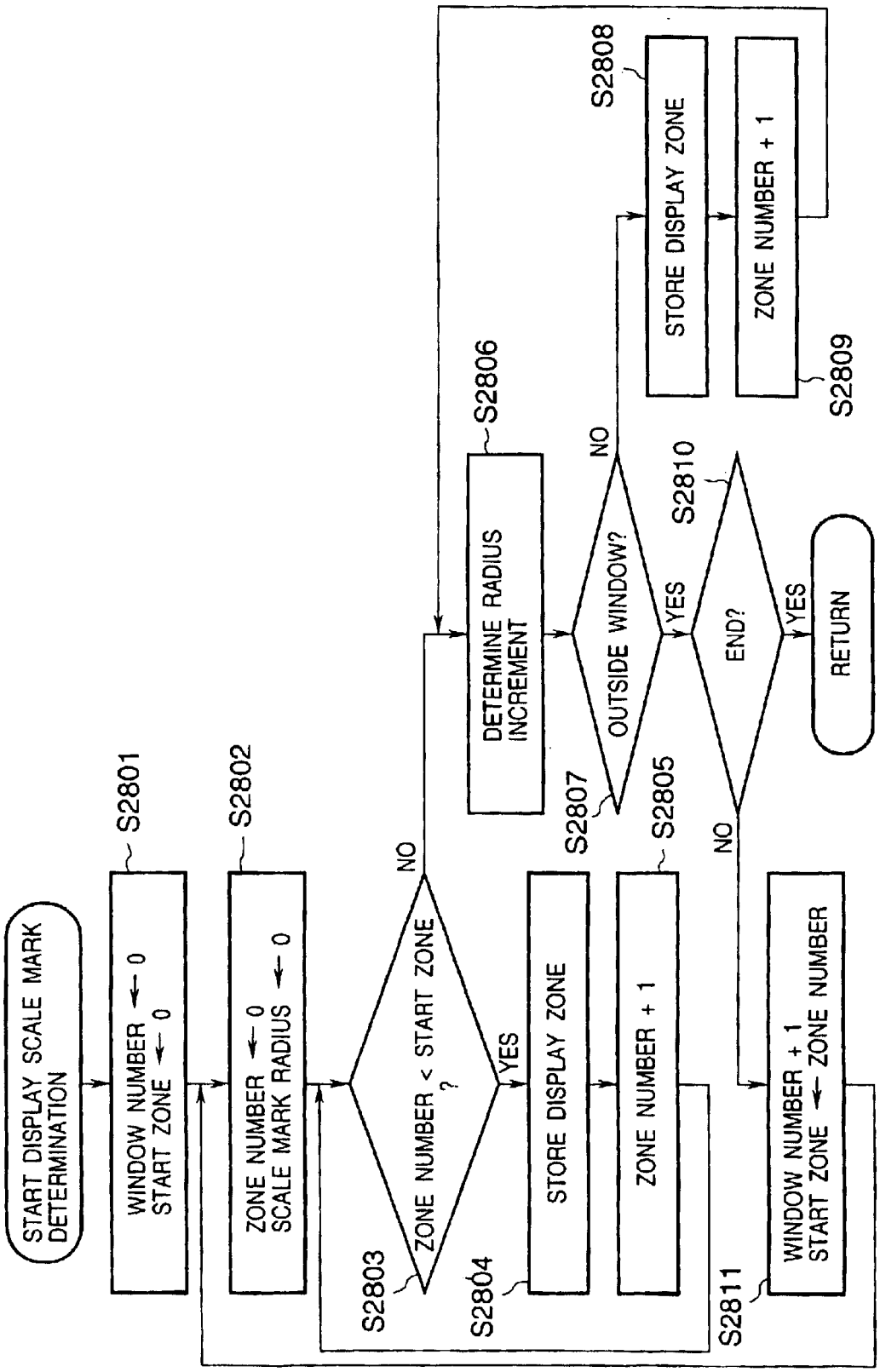
FIG. 28 is a flow chart showing the flow of a display scale mark determination process of the information search apparatus.

FIG. 28 is a flow chart showing the flow of the display scale mark determination process in step S2603 in FIG. 26.

In step S2801, initialization required for determining display scale marks is done. That is, "0" is stored in a window number, and "0" is stored in a start zone. The window number is the number of a window for displaying search results, and the start zone is the number of a zone from which image display is started on each window. Note that the zone indicates the gap between neighboring scale marks. The number of a zone also corresponds to the suffix of the sequence of the distribution information 611. The window number and start zone are assured on the RAM 203.

Also, element values of the window information 613 such as a display start image, scale mark width, and the like are initialized to "−1". Upon completion of this process, the flow advances to step S2802.

In step S2802, "0" is substituted in a zone number and scale mark radius. The zone number and scale mark radius are assured on the RAM 203. The zone number corresponds the suffix of the sequence of the distribution information 611, and zone numbers are assigned in descending order of similarity: zone number "0" is assigned to the matched zone 706, "1" is assigned to a zone between similarity values= "1.0" and "0.9", and so forth. The scale mark radius is a value that expresses the radius of each scale mark displayed on the search result display region 703 by the number of dots. Upon completion of this process, the flow advances to step S2803.

In step S2803, the flow branches based on a comparison result between the zone number and start number. If the zone number value is smaller than the start number value, since no image is displayed on the zone corresponding to the zone number, the flow advances to step S2804; otherwise, since an image is displayed on the zone corresponding to the zone number, the flow advances to step S2806.

In step S2804, an increment of the radius of the zone indicated by the zone number is stored in the window information 613. The radius increment is obtained using the matched zone data 605 when the zone number is "0", or is obtained using the radius increment data 607 when the zone number is other than "0". In this case, since the zone number value is smaller than the start zone value, and no image is displayed on this zone, i.e., the number of images to be displayed is "0", the radius increment is 30 dots independently of whether or not the zone number is "0" or not, as can be seen from FIGS. 10 and 12. If no character string is present in the query box 701, the similar image buffer 609 stores images similar to that indicated by the image ID stored in the query image ID. In this case, when the start zone is other than "0", the query image cannot be identified unless an image indicated by the query image ID is displayed. Hence, in only this case, one image indicated by the query image ID is displayed on the matched zone 706. That is, in such case, if the zone number is "0", the radius increment is 60 dots on the basis of the matched zone data 605 shown in FIG. 10. After the radius increment is determined, it is stored in a scale mark width corresponding to the window number and zone number of the window information 613. For example, when "red apple" is stored in the query box 701, and the window number value is "1", a value "30" is stored by this process as scale mark widths of zones corresponding to similarity values ranging from "1.0" to "0.8", as shown in (T201) in FIG. 18. Also, in this process, the determined radius increment is added to the scale mark radius. Upon completion of this process, the flow advances to step S2805.

In step S2805, the zone number value is incremented by "1" to process a zone next to that indicated by the current zone number. Upon completion of this process, the flow returns to step S2803.

In step S2806, the radius increment of the zone indicated by the zone number is determined. The radius increment can be obtained from the matched zone data 605, radius increment data 607, distribution information 611, and zone number. The number of images to be displayed within the zone indicated by the zone number is obtained using the distribution information 611, and the increment of the radius corresponding to the number of images to be displayed within the zone is obtained using the matched zone data 605 if the zone number is "0" or using the radius increment data 607 if the zone number is other than "0".

For example, when "red apple" is stored in the query box 701, since the distribution information 611 has contents shown in (T101) in FIG. 16, it is determined that "3", "5", "8", "6", "0", and "5" images are respectively displayed on zones with zone numbers "0", "1", "2", "3", "4", and "5", and it is also determined using the matched zone data 605 shown in FIG. 10 and the radius increment data 607 shown in FIG. 12 that the increments of the radii of the individual zones are "120", "90", "90", "90", "30", and "90". On the other hand, when no character string is present in the query box 701 and "999" is stored in the query image ID, since the distribution information 611 has contents shown in (T102) in FIG. 16, it is determined that "1", "3", "4", "2", "3", and "0" images are respectively displayed on the zones with zone numbers "0", "1", "2", "3", "4", and "5", and it is also determined using the matched zone data 605 shown in FIG. 10 and the radius increment data 607 shown in FIG. 12 that the increments of the radii of the individual zones are "60", "60", "60", "60", "60", and "60". Upon completion of this process, the flow advances to step S2807.

In step S2807, the flow branches based on the result of checking if the zone indicated by the zone number can be displayed on the search result display region 703. If a value obtained by adding the radius increment obtained in step S2806 to the scale mark radius value is larger than half the size (600 dots) of the search result display region 703, since the zone indicated by the zone number cannot be displayed on the search result display region 703, the flow advances to step S2810. On the other hand, if a value obtained by adding the radius increment obtained in step S2806 to the scale mark radius value is equal to or smaller than half the size (600 dots) of the search result display region 703, since the zone indicated by the zone number can be displayed on the search result display region 703, the flow advances to step S2808. For example, when the distribution information 611 has contents shown in (T101) in FIG. 16, and when the window number "0" and zone number="2", the scale mark radius value is "300", and the flow advances to step S2808. However, when the window number="0" and zone number= "3", since the scale mark radius value is "390", the flow advances to step S2810.

In step S2808, the radius increment of the zone indicated by the zone number obtained in step S2806 is stored in the window information 613. For example, when the distribution information 611 has contents shown in (TI01) in FIG. 16, "120", "90", and "90" are respectively stored in the window information 613 as scale mark widths for zones corresponding to similarity values ranging from "1.0" to "0.8" for the window number "0", and "90", "30", and "90" are respectively stored in the window information 613 as scale mark widths for zones corresponding to similarity values ranging from "0.7" to "0.5" for the window number "1", as indicated by (T201) in FIG. 18. On the other hand, when the distribution information 611 has contents shown in (T102) in FIG. 16, "60", "60", "60", "60", "60", and "60" are respectively stored in the window information 613 as scale mark widths for zones corresponding to similarity values ranging from "1.0" to "0.6" for the window number "0", as indicated by (T202) in FIG. 18. Also, in this process, the determined radius increment is added to the scale mark radius. Upon completion of this process, the flow advances to step S2809.

In step S2809, the zone number value is incremented by "1" to process a zone next to that indicated by the zone number. Upon completion of this process, the flow returns to step S2806.

In step S2810, the flow branches depending on whether or not the process has been done for all images stored in the similar image buffer 609. If all element values in the distribution information 611 after the zone indicated by the zone number are "0", since the process has been done for all the images, the processing ends. On the other hand, If all element values in the distribution information 611 after the zone indicated by the zone number are not "0", the flow advances to step S2811 to display images which are not processed yet on the next window.

In step S2811, the start zone value is substituted in the start zone corresponding to the window number of the window information 613. The window number value is incremented by "1" to process the next window. Also, the zone number value is substituted in the start zone. Upon completion of this process, the flow returns to step S2802.

Figure 29:
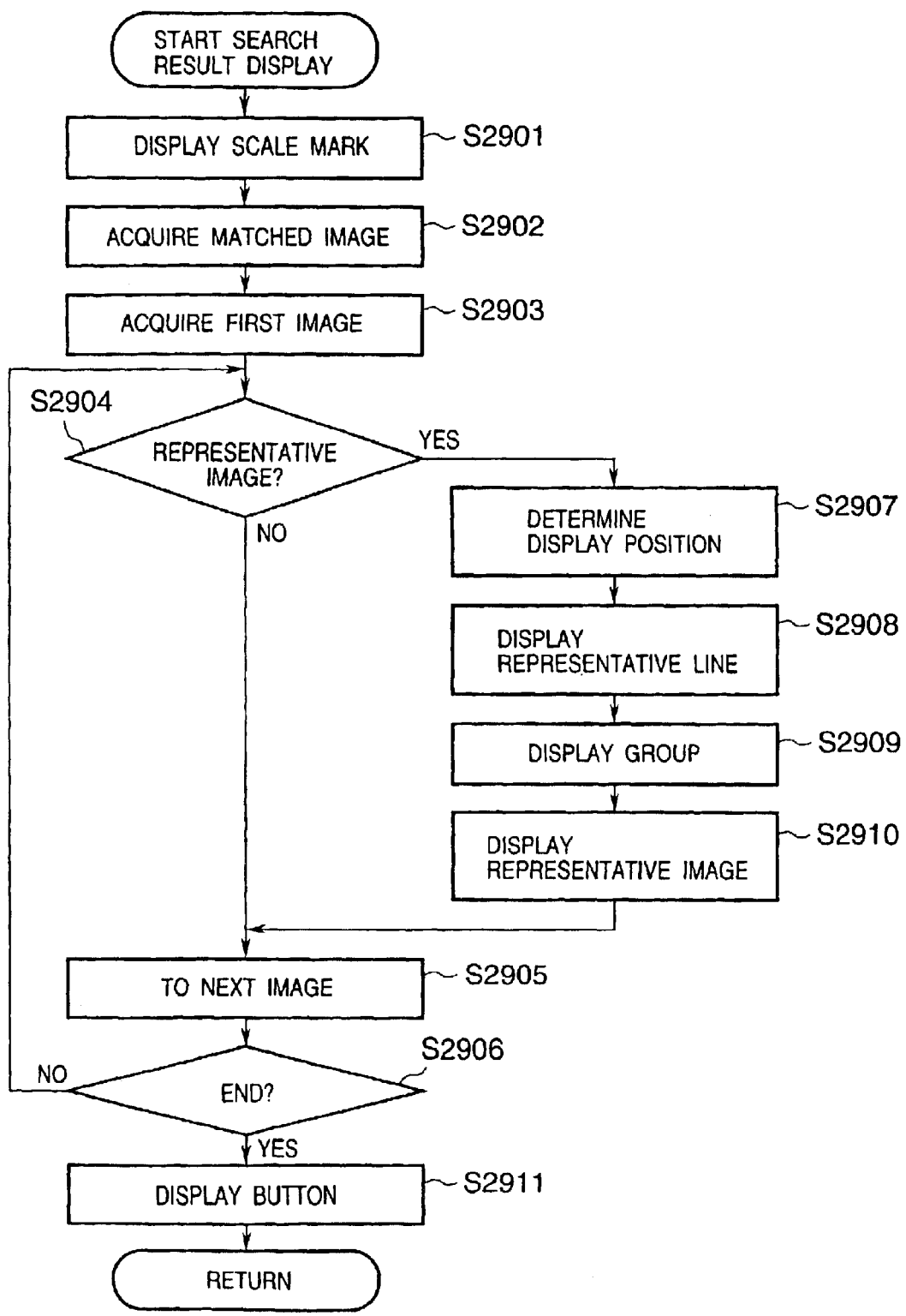
FIG. 29 is a flow chart showing the flow of a search result display process of the information search apparatus.

FIG. 29 is a flow chart showing the flow of the search result display process in step S2210 in FIG. 22, step S2305 in FIG. 23, step S2403 in FIG. 24, and step S2503 in FIG. 25. In this process, a window indicated by the window number is displayed on the display 208 on the basis of the window configuration information stored in the window information 613, and information of images stored in the similar image buffer 609 and image database 604. This process will be described in detail below. In step S2901, scale mark marks are displayed on the search result display region 703 using the scale mark widths in the window information 613 corresponding to the designated window number. The radii of scale marks are added in turn from the scale mark width corresponding to a similarity value="1.0" until the scale mark width value becomes "−1", and circles concentric with the search result display region 703 are displayed in correspondence with the radii of the scale marks. A zone inside the scale mark indicating a similarity value="1.0" is painted in gray. Upon completion of this process, the flow advance to step S2902.

In step S2902, an image or images with a similarity value="1.0" is or are displayed within the matched zone 706. An image ID or IDs corresponding to items with a similarity value="1.0" is or are obtained from the head of the similar image buffer 609, an image file or files corresponding to the image ID or IDs are obtained from the image database 604, and the obtained image file or files is or are displayed within the matched zone 706. In this case, the image file or files is or are displayed at a coordinate position or positions obtained in correspondence with the number of images to be displayed within the matched zone 706 using the matched image data 606. If no character string is present in the query box 701, an image indicated by the query image ID is displayed within a double frame, as shown in FIG. 8. In this case, the image indicated by the query image ID is stored in the similar image buffer 609 to have a similarity value="1.0". Upon completion of this process, the flow advances to step S2903.

In step S2903, the image ID of a first image which has a similarity value other than "1.0" is acquired from the similar image buffer 609 as that of the image to be displayed. Upon completion of this process, the flow advances to step S2904.

In step S2904, the flow branches based on the result of checking if the image to be displayed is a representative image. If the image ID of the image to be displayed is stored as that of the group information 612, it is determined that the image to be displayed is not a representative image, and the flow advances to step S2905. On the other hand, if the image ID of the image to be displayed is not stored as an image ID, it is determined that the image to be displayed is a representative image, and the flow advances to step S2907.

In step S2905, the image ID of the image to be displayed is changed to the next one in the similar image buffer 609. Upon completion of this process, the flow advances to step S2906.

In step S2906, the flow branches depending on whether or not image display is to end. If all images in the similar image buffer 609 have been processed, or if the scale mark width of the zone on which the image to be displayed is displayed is "−1", it is determined that image display is to end, and the flow advances to step S2911. On the other hand, if it is determined that image display is not to end, since image display continues, the flow returns to step S2904.

In step S2907, the display position of the image to be displayed, i.e., the representative image is determined. The direction of the coordinate position of the center of the image to be displayed from the center of the search result display region 703 is determined using the layout angle data 608. Using the layout angle data 608, the direction from the center can be uniquely determined based on the order of the representative image to be displayed. Next, the distance from the center of the search result display region 703 to the coordinate position of the center of the image to be displayed is determined using the window information 613. The distance from the center of the search result display region 703 to the zone where the image is to be displayed can be obtained by accumulating the corresponding scale mark widths in the window information 613 from the zone of "1.0" on the basis of the designated window number and similarity of the image to be displayed. The distance from the center within the zone can be obtained from the scale mark width and similarity since the scale mark width of that zone can be obtained from the window information 613. For example, when the window information 613 has contents (T201) in FIG. 18, and "1" is designated as the window number, and when an image with a similarity value="0.56" is to be displayed, it is determined that this image is displayed within a zone of "0.5", and it is also determined that the distance from the center of the search result display region 703 to the zone of "0.5" is 30+30+30+90+30=210 dots by summing up scale mark widths from "1.0" to "0.6". Also, the distance from the center within the zone of "0.5" is 90×(0.6−0.56)/0.1=36 dots, since the scale mark width of the zone of "0.5" is 90 dots. Hence, in this case, it is determined that the distance from the center of the search result display region 703 to the center of the image with similarity="0.56" is 210+36=246 dots. In this manner, since the angle and distance from the center of the search result display region 703 can be obtained, the image display position can be determined. Upon completion of this process, the flow advances to step S2908.

In step S2908, a representative line is displayed from the center of the search result display region 703 to the display position obtained in step S2907. In this case, no representative line is displayed within the matched zone 706. Upon completion of this process, the flow advances to step S2909.

Step S2909 is a process for displaying images in a group to which the representative image of interest belongs except for the representative image. Images in a group to which the representative image belongs can be obtained using the group information 612. All images whose representative image ID values in the group information 612 are equal to the image ID value of the representative image to be displayed are displayed. The distance from the center of the search result display region 703 to each image to be displayed can be obtained from the similarity of that image in the similar image buffer 609 in the same manner as in step S2907. Also, the distance from the display position of the representative image to that of each image can be determined from the group information 612. For example, corresponding similarity can be obtained from the group information 612 on the basis of the representative image ID and the image ID of the image to be displayed, and the distance can be determined by multiplying a value obtained by subtracting that similarity from "1.0" by 500. The respective images are alternately displayed on the counterclockwise and clockwise sides of the representative line to have the search result display region 703 as the center in ascending order of similarity with the representative image. In this manner, since the distance can be obtained from two points, i.e., the center of the search result display region 703 and that of the representative image, and the display side of a line connecting the two points can be determined, the display position of each image can be determined. Upon determination of the display positions of the individual images, lines that connect the centers of the individual images and the center of the representative image are displayed, and images are displayed in ascending order of similarity with the representative image. Since images are displayed in such order, when images overlap each other, an image having higher similarity with the representative image is less likely to be concealed by other images. Upon completion of this process, the flow advances to step S2910.

In step S2910, the representative image is displayed at the position obtained in step S2907. In this manner, since the representative image is displayed last in the group, the representative image having highest similarity in the group can be prevented from being concealed by other images. Upon completion of this process, the flow advances to step S2905.

In step S2911, the previous and next window buttons 712 and 713 are displayed. If the designated window number is "0", since there is no previous window, the triangle mark of the previous window button 712 is displayed in white; if the designated window number is not "0", since there is a previous window, the triangle mark of the previous window button 712 is displayed in black. If the value of the start zone in the window information 613 corresponding to a window number obtained by adding "1" to the designated window number is "−1", since there is no next window, the triangle mark of the next window button 713 is displayed in white; if the value of the start zone in the window information 613 corresponding to a window number obtained by adding "1" to the designated window number is not "−1", since the next window is present, the triangle mark of the next window button 713 is displayed in black. Upon completion of this process, the processing ends.

As described above, according to this embodiment, since a specific image close to desired information is selected from images displayed on the display 208, and similar images similar to the selected specific images are searched for and displayed, even when the query condition cannot be accurately expressed, a desired image can be found by search and displayed on the display 208.

As described in detail above, according to the information search method and apparatus of this embodiment, since the matching level range where search results are displayed is determined on the basis of the distribution of the number of pieces of information of search results with respect to the matching levels, and the like, even when there are a large number of pieces of information that satisfy the query condition, each search result information can be easily reviewed by narrowing down the matching level range to be displayed.

When different search result display windows are to be displayed in correspondence with matching levels on a window, which does not display images that are a perfect match, since scale marks indicating higher matching levels are displayed at narrower graduation intervals, the highest matching level on the current window can be recognized at a glance. Since the display distance between neighboring scale marks can be changed in units of scale marks, the display distance between scale marks is increased for a zone on which a large number of pieces of information are displayed, and is decreased for a zone on which a small number of pieces of information are displayed. Hence, search results can be efficiently displayed on the search result display region, and a large number of pieces of information to be displayed within a single zone can be prevented from overlapping each other and from becoming hard to see.

(Another Embodiment)

In the above embodiment, the similar image information 610 is generated every time in step S2002 in FIG. 20. Alternatively, the similar image information 610 may be generated in advance by executing the same process as in step S2002 in FIG. 20 may be stored in the CD-ROM 205 as associated data, and may be loaded onto the RAM 203 in step 52001 in FIG. 20.

In the above embodiment, the image database 502 is stored in the CD-ROM 205. Alternatively, an image database stored in the hard disk may be used.

In the above embodiment, the information search program and associated data are directly loaded from the CD-ROM 205 as an external storage device onto the RAM 203, and are then executed. Also, the information search program and associated data may be temporarily stored (installed) from the CD-ROM 205 in the hard disk, and may be loaded from the hard disk onto the RAM 203 upon executing the information search program.

As the storage medium for storing the information search program, an FD (floppy disk), IC memory card, or the like may be used in place of the CD-ROM 205.

The information search program may be stored in the ROM 202 to construct a part of the memory map, and may be directly executed by the CPU 201.

In the above embodiment, English is used as a language for expressing a query and comment. The present invention is not limited to English, but may be applied to every other languages including Japanese.

In the above embodiment, in order to obtain images similar to the designated image in step S2011 in FIG. 20, similarity is calculated using comments appended to images. However, the present invention is not limited to such specific similarity calculation method. For example, similarity may be calculated using information of the image itself such as the luminance, color, composition, and the like of the image.

In the above embodiment, images are searched for as the information wanted in information search. However, the information wanted is not limited to images in the present invention. For example, the present invention is effective for various other kinds of information such as document data, video data, audio data, and the like. As search results displayed on the search result display region, when an image is searched for, the image itself is displayed. For example, when a document is searched for, a document title, keyword, and the like may be displayed in place of an image. In case of video data, information that represents that video data such as a title, representative scene, and the like may be displayed, or videos of the individual results may be displayed.

In the above embodiment, as shown in FIG. 6, the matched zone is defined by a circular zone which is concentric with the search result display region, the respective scale marks are displayed as circles concentric with the matched zone, and images as search results are displayed to be laid out in a radial pattern from the center of the search result display region so that their similarity values correspond to the distances from the matched zone. However, the present invention is not limited to such specific layout. For example, as shown in FIG. 30, a matched zone 3001 may be defined by a rectangular zone on the left side of the search result display region, scale marks 3002 and 3003 may be defined by lines parallel to the left side, and perpendiculars dropped from the respective images to the matched zone may be displayed in correspondence with the similarity values of the respective images. In this case, the layout position of each image is designated by the distance from the upper side of the search result display region in place of the angle with respect to the center of the matched zone unlike in the layout angle data 608, thus displaying search result images at desired positions in the same procedure as that in the above embodiment. Even when search results are displayed in such layout, search result images can be grouped and displayed as in the above embodiment, as shown in FIG. 30.

In the above embodiment, the radius increment data 607 stores radius increments in correspondence with the number of images to be displayed within each zone between neighboring scale marks. Alternatively, radius increments may be stored in correspondence with the number of representative images of groups within each zone between neighboring scale marks. In this case, the distribution information 611 must store the number of representative images of groups within each zone between neighboring scale marks, and the execution order of the distribution information generation process in step S2601 in FIG. 26 and the grouping process in step S2602 must be replaced, i.e., the distribution information generation process must be done after the grouping process. In this manner, more search results can be displayed within a limited region.

In the above embodiment, the display graduation interval between neighboring scale marks is determined using the radius increment data 607 in units of scale marks. Alternatively, the number of images or the number of representative images in groups to be displayed on the search result display region may be determined in advance, images to be displayed may be determined in descending order of similarity, and the display graduation interval between neighboring scale marks may be determined from the minimum similarity value of images to be displayed and the size of the search result display region, so as to set identical display graduation intervals of the scale marks.

As many apparently widely different embodiments of the present invention can be made without departing from the spirit and scope thereof, it is to be understood that the invention is not limited to the specific embodiments thereof except as defined in the appended claims.

What is claimed is:

1. An information search apparatus for searching and displaying information, comprising:

matching level calculation means for calculating a matching level as a degree to which information satisfies a query condition;

scale mark determination means for determining to display a graduation interval of a scale mark, the scale mark indicating a change in the matching level;

scale mark display control means for displaying the scale mark;

display position determination means for determining a display position of information that satisfies the query condition on the basis of the displayed graduation interval of the scale mark determined by said scale mark determination means and the matching level calculated by said matching level calculation means; and search result display control means for displaying the information on the basis of the display position determined by said display position determination means.

2. An apparatus according to claim 1, further comprising:

query condition input means for inputting the query condition; and information storage means for storing a plurality of pieces of information which undergo a search, wherein said matching level calculation means calculates matching levels as degrees to which the query condition is satisfied by comparing each information stored in said information storage means and the query condition input by said query condition input means, and wherein said scale mark determination means determines display graduation intervals and display positions of the scale marks indicating a change in matching level.

3. An apparatus according to claim 1, wherein said scale mark determination means individually determines the display graduation interval of each scale mark.

4. An apparatus according to claim 3, wherein said scale mark determination means determines the display graduation interval of the scale mark on the basis of a number of pieces of information to be displayed between neighboring scale marks.

5. An apparatus according to claim 1, wherein said search result display control means displays a plurality of pieces of information which satisfy the query condition in a radial pattern to have a point where the matching level indicates a perfect match as the center, said scale mark determination means determines a radius of a scale mark on the basis of the number of pieces of information to be displayed between neighboring scale marks and a radius of the neighboring scale mark, and said scale mark display control means displays, as the scale marks, circles having the point where the matching level indicates a perfect match as the center.

6. An apparatus according to claim 1, wherein said scale mark determination means determines the display graduation interval of the scale mark on the basis of a minimum matching level of information displayed by said search result display control means and a size of an information display region.

7. An apparatus according to claim 1, further comprising grouping means for grouping a plurality of pieces of information displayed by said search result display control means, wherein said scale mark determination means determines the display graduation interval of the scale mark on the basis of the number of groups to be displayed between neighboring scale marks, and wherein said display position determination means determines display positions to display a plurality of pieces of information belonging to a given group grouped by said grouping means at neighboring positions.

8. An apparatus according to claim 1, wherein said search result display control means displays information that satisfies the query condition with reference to a straight line indicating a perfect matching level, said scale mark determination means determines the display graduation interval of the scale mark on the basis of the number of pieces of information to be displayed between neighboring scale marks, and said scale mark display control means displays the straight line indicating the perfect matching level as the scale mark.

9. An apparatus according to claim 1, wherein said apparatus can be applied to search information such as an image, document, video, and audio.

10. An information search method applied to an information search apparatus for searching and displaying information, said method comprising:

a matching level calculation step, of calculating a matching level as a degree to which information satisfies a query condition;

a scale mark determination step, of determining display a graduation interval of a scale mark, the scale mark indicating a change in the matching level;

a scale mark display control step, of displaying the scale mark;

a display position determination step, of determining a display position of information that satisfies the query condition on the basis of the displayed graduation interval of the scale mark determined in said scale mark determination step and the matching level calculated in said matching level calculation step; and a search result display control step, of displaying the information on the basis of the display position determined in said display position determination step.

11. A method according to claim 10, further comprising a query condition input step, of inputting the query condition, wherein said matching level calculation step includes the step of calculating matching levels as degrees to which the query condition is satisfied by comparing each information stored in information storage means, which stores a plurality of pieces of information which undergo a search and the query condition input in said query condition input step, and wherein said scale mark determination step includes the step of determining display graduation intervals and display positions of scale marks indicating a change in matching level to display the scale marks.

12. A method according to claim 10, wherein said scale mark determination step includes the step of individually determining the display graduation interval of each scale mark.

13. A method according to claim 12, wherein said scale mark determination step includes the step of determining the display graduation interval of the scale mark on the basis of a number of pieces of information to be displayed between neighboring scale marks.

14. A method according to claim 10, wherein said search result display control step includes the step of displaying a plurality of pieces of information which satisfy the query condition in a radial pattern to have a point where the matching level indicates a perfect match as the center, said scale mark determination step includes the step of determining a radius of a scale mark on the basis of the number of pieces of information to be displayed between neighboring scale marks and a radius of the neighboring scale mark, and said scale mark display control step displays, as the scale marks, circles having the point where the matching level indicates a perfect match as the center.

15. A method according to claim 10, wherein said scale mark determination step includes the step of determining the display graduation interval of the scale mark on the basis of a minimum matching level of information displayed in the search result display control step and a size of an information display region.

16. A method according to claim 10, further comprising a grouping step, of grouping a plurality of pieces of information displayed in said search result display control step, wherein said scale mark determination step includes the step of determining the display graduation interval of the scale mark on the basis of the number of groups to be displayed between neighboring scale marks, and said display position determination step includes the step of determining display positions to display a plurality of pieces of information belonging to a given group grouped in said grouping step at neighboring positions.

17. A method according to claim 10, wherein said search result display control step includes the step of displaying information that satisfies the query condition with reference to a straight line indicating a perfect matching level, said scale mark determination step includes the step of determining the display graduation interval of the scale mark on the basis of a number of pieces of information to be displayed between neighboring scale marks, and said scale mark display control step displays the straight line indicating the perfect matching level as the scale mark.

18. A method according to claim 10, wherein said method can be applied to search information such as an image, document, video, and audio.

19. A computer readable storage medium storing a program for searching and displaying information, said program comprising:

code for a matching level calculation step, of calculating a matching level as a degree to which information satisfies a query condition;

code for a scale mark determination step, of determining a display graduation interval of a scale mark, the scale mark indicating a change in the matching level;

code for a scale mark display control step, of displaying the scale mark;

code for a display position determination step, of determining a display position of information that satisfies the query condition on the basis of the displayed graduation interval of the scale mark determined in said scale mark determination step and the matching level calculated in said matching level calculation step; and code for a search result display control step, of displaying the information on the basis of the display position determined in said display position determination step.

20. A medium according to claim 19, wherein said program further comprises code for a query condition input step, of inputting the query condition, wherein said matching level calculation step includes the step of calculating matching levels as degrees to which the query condition is satisfied by comparing each information stored in information storage means, which stores a plurality of pieces of information which undergo a search and the query condition input in said query condition input step, and wherein said scale mark determination step includes the step of determining display graduation intervals and display positions of scale marks indicating a change in matching level to display the scale marks.

21. A medium according to claim 19, wherein said scale mark determination step includes the step of individually determining the display graduation interval of each scale mark.

22. A medium according to claim 21, wherein said scale mark determination step includes the step of determining the display graduation interval of the scale mark on the basis of a number of pieces of information to be displayed between neighboring scale marks.

23. A medium according to claim 19, wherein:

said search result display control step includes the step of displaying a plurality of pieces of information which satisfy the query condition in a radial pattern to have a point where the matching level indicates a perfect match as the center, said scale mark determination step includes the step of determining a radius of a scale mark on the basis of the number of pieces of information to be displayed between neighboring scale marks and a radius of the neighboring scale mark, and said scale mark display control step displays, as the scale marks, circles having the point where the matching level indicates a perfect match as the center.

24. A medium according to claim 19, wherein said scale mark determination step includes the step of determining the display graduation interval of the scale mark on the basis of a minimum matching level of information displayed in the search result display control step and a size of an information display region.

25. A medium according to claim 19, wherein said program further comprises code for a grouping step, of grouping a plurality of pieces of information displayed in the search result display control step, said scale mark determination step includes the step of determining the display graduation interval of the scale mark on a basis of the number of groups to be displayed between neighboring scale marks, and said display position determination step includes the step of determining display positions to display a plurality of pieces of information belonging to a given group grouped in said grouping step at neighboring positions.

26. A medium according to claim 19, wherein said search result display control step includes the step of displaying information that satisfies the query condition with reference to a straight line indicating a perfect matching level, said scale mark display determination step includes the step of determining the display graduation interval of the scale mark on the basis of the number of pieces of information to be displayed between neighboring scale marks, and said scale mark display control step displays the straight line indicating the perfect matching level as the scale mark.

27. A medium according to claim 19, wherein said program can be applied to search information such as an image, document, video, and audio.

* * * * *

UNITED STATES PATENT AND TRADEMARK OFFICE
CERTIFICATE OF CORRECTION

PATENT NO. : 6,823,335 B2
DATED : November 23, 2004
INVENTOR(S) : Kazuyo Ikeda

It is certified that error appears in the above-identified patent and that said Letters Patent is hereby corrected as shown below:

Column 1,
Line 46, "those" should read -- that --.

Column 8,
Line 13, ""000000.jpg"," should read -- "0000000.jpg", --; and
Line 36, "suffices" should read -- suffixes --.

Column 12,
Line 2, "result" should read -- results --.

Column 16,
Line 59, "suffices" should read -- suffixes --.

Column 18,
Line 7, "corresponds" should read -- corresponds to --.

Column 19,
Line 38, "number "0"" should read -- number= "0" --; and
Line 46, "(TI01)" should read -- (T101) --.

Column 20,
Line 6, "If" should read -- if --; and
Line 35, "advance" should read -- advances --.

Column 23,
Line 23, "step 52001" should read -- step S2001 --; and
Line 44, "languages" should read -- language --.

UNITED STATES PATENT AND TRADEMARK OFFICE
CERTIFICATE OF CORRECTION

PATENT NO.    : 6,823,335 B2
DATED         : November 23, 2004
INVENTOR(S)   : Kazuyo Ikeda It is certified that error appears in the above-identified patent and that said Letters Patent is hereby corrected as shown below:

Column 26,
Line 15, "display a" should read -- a display --; and
Line 34, "in" should read -- in the --.

Signed and Sealed this

Thirtieth Day of August, 2005

JON W. DUDAS
*Director of the United States Patent and Trademark Office*